(12) United States Patent
Potter et al.

(10) Patent No.: US 9,719,856 B2
(45) Date of Patent: Aug. 1, 2017

(54) CODED SPECTRAL IMAGER

(71) Applicant: Arete Associates, Northridge, CA (US)

(72) Inventors: Randall Potter, Northridge, CA (US); Brian David Clader, Ellicott City, MD (US)

(73) Assignee: Areté Associates, Northridge, CA (US)

( * ) Notice: Subject to any disclaimer, the term of this patent is extended or adjusted under 35 U.S.C. 154(b) by 29 days.

(21) Appl. No.: 14/837,623

(22) Filed: Aug. 27, 2015

(65) Prior Publication Data

US 2016/0065915 A1 Mar. 3, 2016

Related U.S. Application Data

(60) Provisional application No. 62/042,570, filed on Aug. 27, 2014.

(51) Int. Cl.
| | |
|---|---|
| *H04N 9/04* | (2006.01) |
| *G01J 3/28* | (2006.01) |
| *G01J 3/36* | (2006.01) |
| *G01J 3/02* | (2006.01) |
| *H04N 9/09* | (2006.01) |

(52) U.S. Cl.
CPC .......... *G01J 3/2823* (2013.01); *G01J 3/0229* (2013.01); *G01J 3/36* (2013.01); *H04N 9/09* (2013.01); *G01J 2003/2826* (2013.01)

(58) Field of Classification Search
CPC ...................................................... H04N 9/09
USPC ........................................................ 348/273
See application file for complete search history.

(56) References Cited

U.S. PATENT DOCUMENTS

2016/0171653 A1* 6/2016 Mendlovic ................ G01J 3/26
348/280

* cited by examiner

*Primary Examiner* — Joel Fosselman
(74) *Attorney, Agent, or Firm* — Duft Bornsen & Fettig LLP; Drew N. Smith

(57) ABSTRACT

Embodiments herein provide for imaging objects. In one embodiment, a spectral imaging system includes an optical element configured to receive electromagnetic energy of a two-dimensional scene and a filter configured to provide a plurality of spectral filter profiles. The filter also transmits multiple spectral wavebands of the electromagnetic energy substantially simultaneously through at least one of the spectral profiles. The spectral imaging system also includes a detector configured to measure intensities of the multiple spectral wavebands, and a processor configured to generate a spectral image of the scene based on the measured intensities.

14 Claims, 22 Drawing Sheets

CODED SPECTRAL IMAGER

CROSS REFERENCE TO RELATED APPLICATIONS

This patent application is a non-provisional patent application claiming priority to, and thus the benefit of an earlier filing date from, U.S. Provisional Patent Application No. 62/042,570 (filed Aug. 27, 2014), the entire contents of which are hereby incorporated by reference.

FIELD OF THE INVENTION

The invention relates to spectral analysis of images.

BACKGROUND

A scene viewed by a hyperspectral imaging system is often displayed as a three-dimensional datacube, where two dimensions represent the spatial domain (x, y) and one dimension represents the spectral domain ($\lambda$). Spatial observations (x, y) allow a person to observe an image when high contrast is available. However, during conditions of low contrast, such as fog, smoke, camouflage, and/or darkness, spectral signatures help identify otherwise unobservable objects. Hyperspectral imagers are capable of collecting and processing objects within a scene by dividing the whole spectrum into tens or even hundreds of bands and thus can obtain high resolution datacubes useful in a wide range of applications such as mining, agriculture, chemical detection, and military surveillance. Conventional hyperspectral devices face a tradeoff between spectral resolution and the signal to noise ratio (SNR) of the estimated spectrum. Thus, there is an ongoing need for imaging systems that maximize the signal to noise ratio (SNR) of the estimated spectrum without sacrificing capability of generating datacubes with high spectral resolution.

SUMMARY

Systems and methods presented herein provide for imaging an object. In one embodiment, a spectral imaging system includes an optical element configured to receive electromagnetic energy of a two-dimensional scene and a filter configured to provide a plurality of spectral filter profiles. The filter also transmits multiple spectral wavebands of the electromagnetic energy substantially simultaneously (i.e., at or about the same time) through at least one of the spectral profiles. The spectral imaging system also includes a detector configured to measure intensities of the multiple spectral wavebands, and a processor configured to generate a spectral image of the scene based on the measured intensities.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
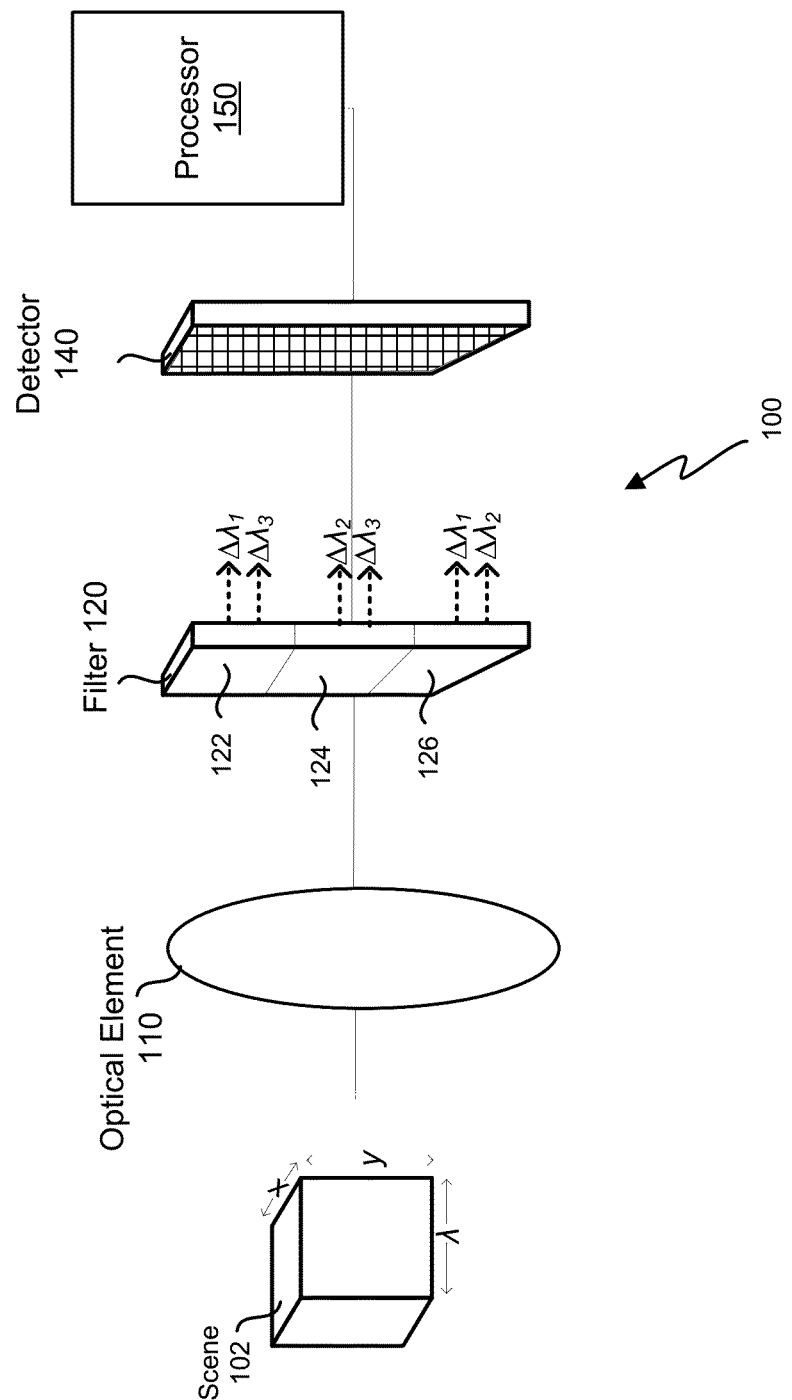
FIG. 1 is a block diagram of an imaging system in an exemplary embodiment.

FIG. 1 is a block diagram of an exemplary imaging system 100. Imaging system 100 is capable of generating hyperspectral images of a scene 102, where each hyperspectral image includes a full spectral profile (e.g., light intensity as a function of wavelength) of an individual pixel of a two-dimensional image. A series of hyperspectral images may be organized into a three-dimensional datacube, where two dimensions represent the spatial domain (x, y) and one dimension represents the spectral domain (λ) of scene 102.

Imaging system 100 includes an optical element 110, a filter 120, a detector 140, and a processor 150. Optical element 110 is any combination of devices operable to propagate electromagnetic energy (e.g., photons) from an object or scene 102 through imaging system 100. Such devices may include focusing lenses, relay lenses, collimating lenses, dispersers, gratings, reflectors, etc.

Filter 120 is any system, component, or device operable to transmit in two or more wavebands simultaneously, or substantially simultaneously, and to attenuate in at least one other waveband. In one embodiment, filter 120 comprises multiple spectral profiles 122-126, any of which are operable to pass multiple distinct wavebands, or wavelength spectrums. For simplicity, FIG. 1 shows filter 120 implemented with three spectral profiles 122-126, each transmitting different combinations of two out of three spectral bands, marked λ1, λ2, and λ3. However, alternative configurations, number of spectral profiles 122-126, and/or number/combination of transmitted wavebands through each spectral profile 122-126 are possible in accordance with the particular spectral range of interest. Additionally, as will be discussed in further detail below, imaging system 100 may implement one or multiple filters in alternative configurations.

Detector 140 is any system, component, or device operable to receive the multiple wavebands of electromagnetic energy transmitted through filter 120 and to generate one or more electrical signals that indicate electromagnetic intensity as a function of wavelength. As used herein, detector 140 may refer to a single detector element, or pixel, within a two-dimensional detector array of detector elements. Alternatively, detector 140 may refer to the detection of a larger area or entire two-dimensional image of scene 102. Detector 140 may comprise, for example, a charge-coupled device (CCD) sensor, a silicon based complementary metal-oxide-semiconductor (CMOS) sensor, or other types of sensors and sensor elements.

Processor 150 is any system, component, or device operable to reconstruct a hyperspectral image of scene 102 using the intensity values of detector 140. Thus, processor 150 may be communicatively coupled with detector 140 to receive the intensity values output by detector 140. Processor 150 may use digital processing techniques to demodulate the measured intensities into separate, individual waveband signals. Thus, though multiple lines of radiation are focused onto a single detector or detector element, processor 150 may separately analyze the characteristics of each line of radiation for use in analyzing the composition of scene 102.

Previous imaging systems obtain hyperspectral images at high spectral resolution by using a narrow passband, or narrow spectrometer input slit, and scanning one wavelength band sequentially over time. Since spectral information in such imagers is not acquired at the same time, these imagers are not able to benefit from the improvement in signal to noise ratio (SNR) that multiplexing provides. The SNR is further reduced in these systems because the passband reduces the throughput of electromagnetic energy through the imager. For example, if an incident signal with a uniform spectrum is split into 100 equally separated wavebands, the photon flux into each waveband will be 1% of the photon flux from the entire signal. Consequently, the SNR for a detector measuring a single waveband would be 10 times less than the signal to noise ratio for a detector measuring the entire photon flux associated with all the wavebands.

Other spectral imaging systems use a multiplexed focal plane array where an image is passed through an interferometric assembly. This technique, commonly referred to as Fourier transform spectrometry, enables multiplexing of a two-dimensional spatial image without limiting the light throughput with a narrow slit. However, these systems record the spectral dimension with precise mirror positioning which makes such systems susceptible to vibrations and therefore unsuitable for imaging systems in airplanes, unmanned aerial vehicles, and other applications.

Imaging system 100 advantageously enables a combination of high throughput of radiation and simultaneous multiband or multiplex wavelength scanning. The higher throughput arises from the fact that filter 120 of imaging system 100 allows a larger transmissive area than the slits or passband filters, thus enabling higher throughput of radiation, increased signal measurement, and larger SNR ratios. Further, filter 120 and detector 140 allow imaging system 100 to collect electromagnetic radiation from a plurality of spectral bands in simultaneous fashion, therefor providing imaging system 100 with a multiplex advantage without complication of components susceptible to vibrations.

Imaging system 100 also allows for collection of two-dimensional images, wide-field spectral images over time. Additionally, as discussed in greater detail below, design characteristics of imaging system 100 allow processing functions to improve post-processing of the resulting datacube. Imaging system 100 is thus useful for a variety of imaging applications such as persistent surveillance where high spectral resolution is desired (e.g., hyperspectral applications) and/or where there is a limit to the amount of electromagnetic energy available (e.g., low light conditions).

Figure 2:
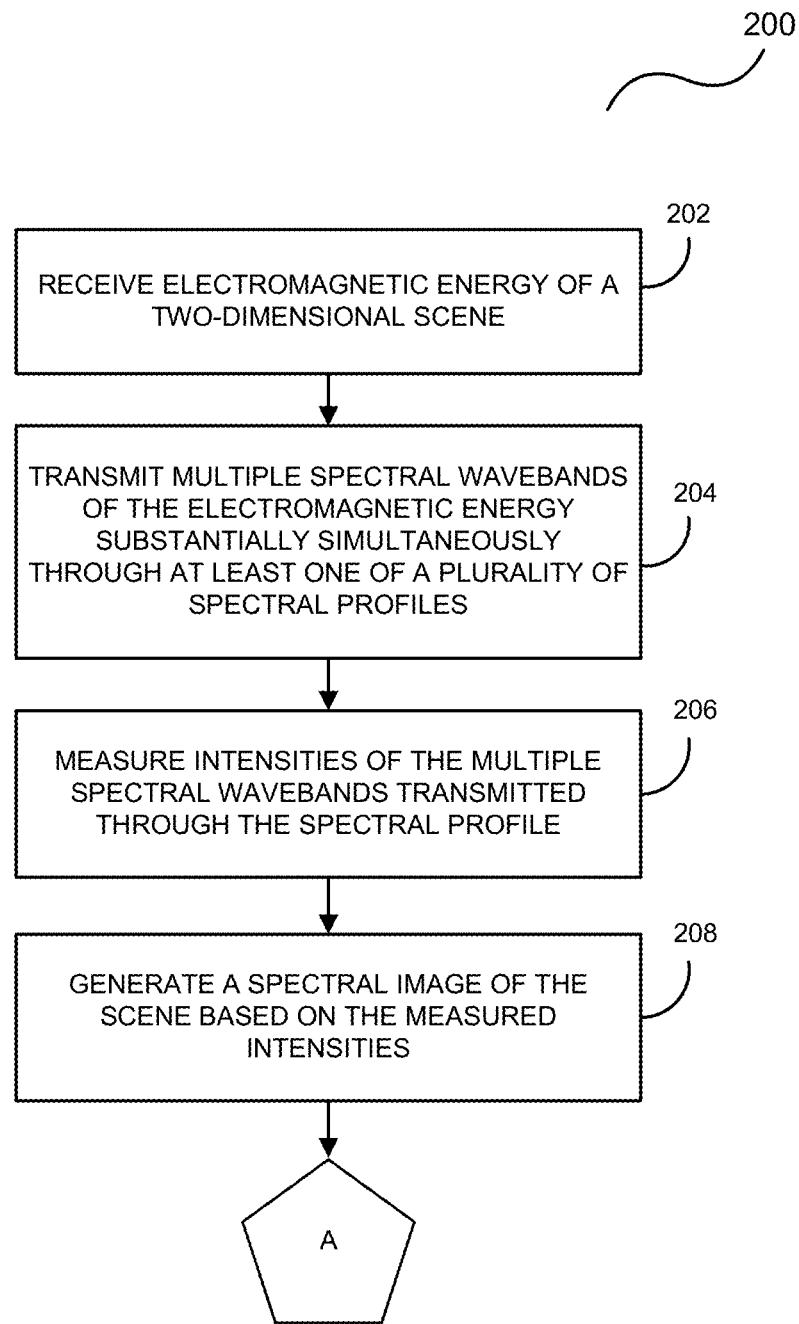
FIG. 2 is a flowchart illustrating an exemplary process of the imaging system of FIG. 1.

FIG. 2 illustrates a flowchart of an exemplary process 200 of imaging system 100. In step, 202 optical element 110 receives electromagnetic energy of a two-dimensional scene (e.g., scene 102). Optical element 110 may focus a two-dimensional image of scene 102 in the plane of filter 120. In step 204, filter 120 transmits multiple spectral wavebands of the electromagnetic energy substantially simultaneously through at least one of a plurality of spectral profiles 122-126. In step 206, detector 140 measures intensities of the multiple spectral wavebands transmitted through the spectral profile. In step 208, processor 150 generates a spectral image of the scene based on the measured intensities.

Figure 3:
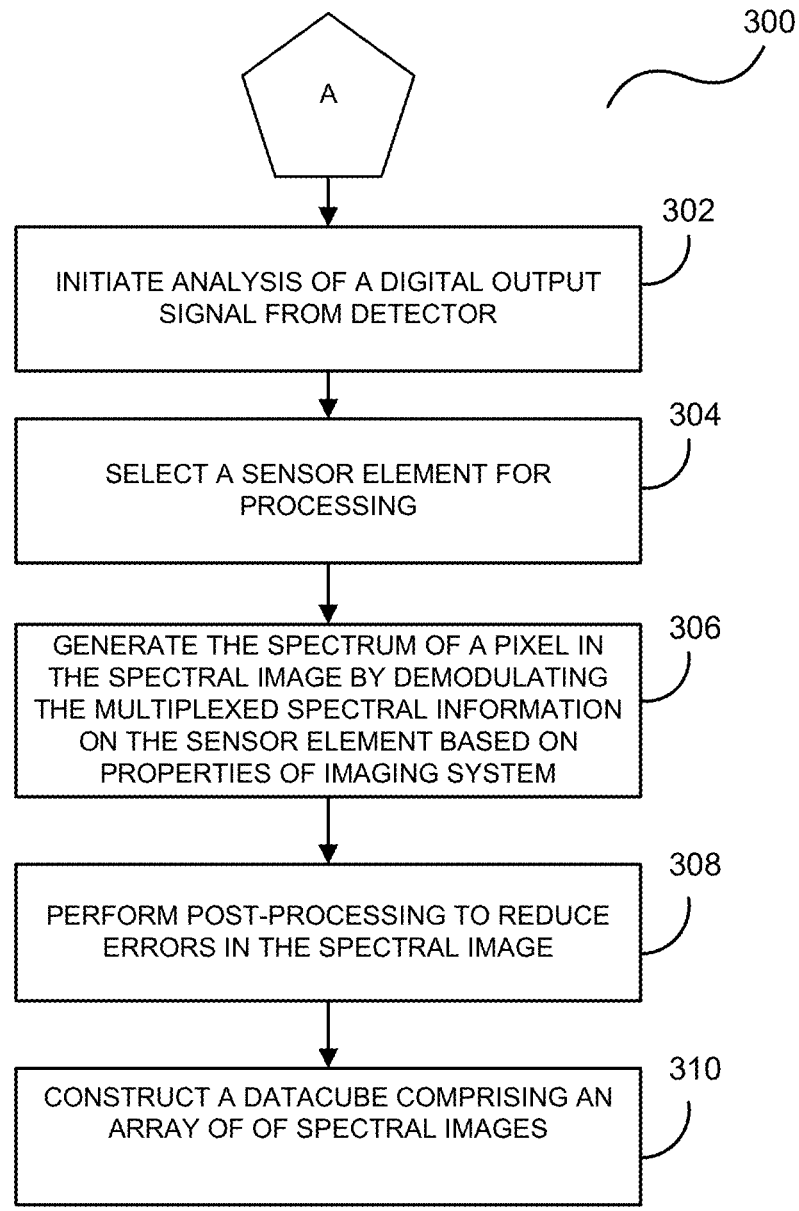
FIG. 3 is a flowchart illustrating an exemplary process of the imaging system of FIG. 1.

FIG. 3 illustrates a flowchart of another exemplary process 300 of imaging system 100. FIG. 3 describes processes which may be performed by processor 150 during or after generation of a spectral image (e.g., step 208 of process 200). In step 302, processor 150 initiates analysis of a digital output signal from detector 140. In step 304, processor 150 selects a sensor element of detector 140, or pixel, for processing.

In step 306, processor 150 generates the spectrum of a pixel in the spectral image by demodulating the encoded spectral information on that sensor element according to the properties of imaging system 100. Processor 150 is operable to reconstruct underlying information of scene 102 using algorithms which decode the multiplexed information received at detector 140 using properties of filter 120 and/or other elements in imaging system 100. In that regard, processor 150 may receive, store, or be programmed with information that models imaging system 100 to enable processor 150 to generate spatial and/or spectral information of a pixel based on the intensity and position of the selected sensor element.

In step 308, processor 150 may optionally perform post-processing on the hyperspectral image to reduce errors in the image. Additional detail of such post-processing will be described in greater detail below. Then, in step 310, processor 150 generates a datacube of scene 102 which comprises an array of spectral images (e.g., obtained by iteratively performing process 200 and/or steps 302-308).

Figure 4:
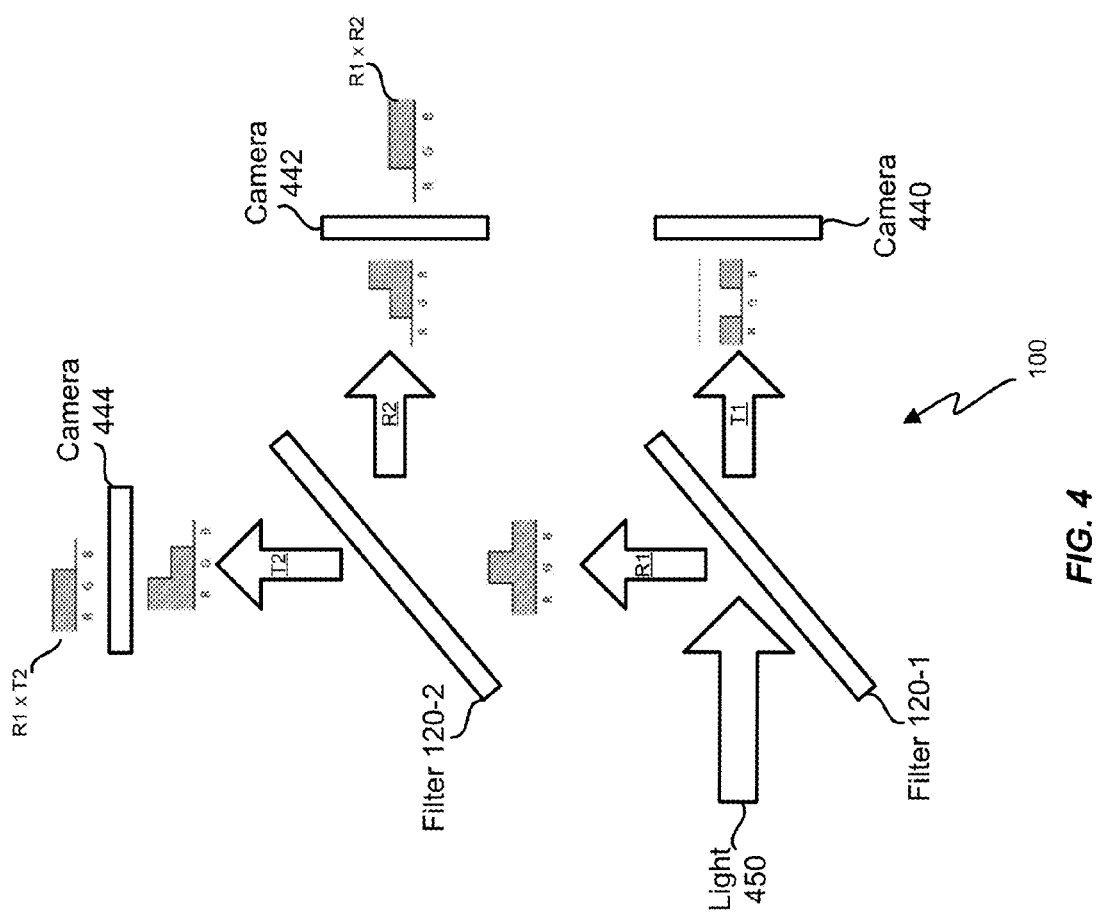
FIG. 4 is a block diagram of an imaging system in another exemplary embodiment.

It will be appreciated that one or more steps of processes 200/300 may be performed on imaging system 100 having alternative configurations. FIG. 4 is a block diagram of imaging system 100 with multiple static filters 120-1 and 120-2 and multiple cameras 440-444 or detectors in an exemplary embodiment. Static filters 120-1 and 120-2 each transmit a portion of the spectrum (e.g., light 450) and reflect another portion of the spectrum. That is, the exemplary imaging system 100 of FIG. 4 implements a series of static multiple-waveband filters that transmit/reflect a different portion of the spectrum from one another.

Figure 5:
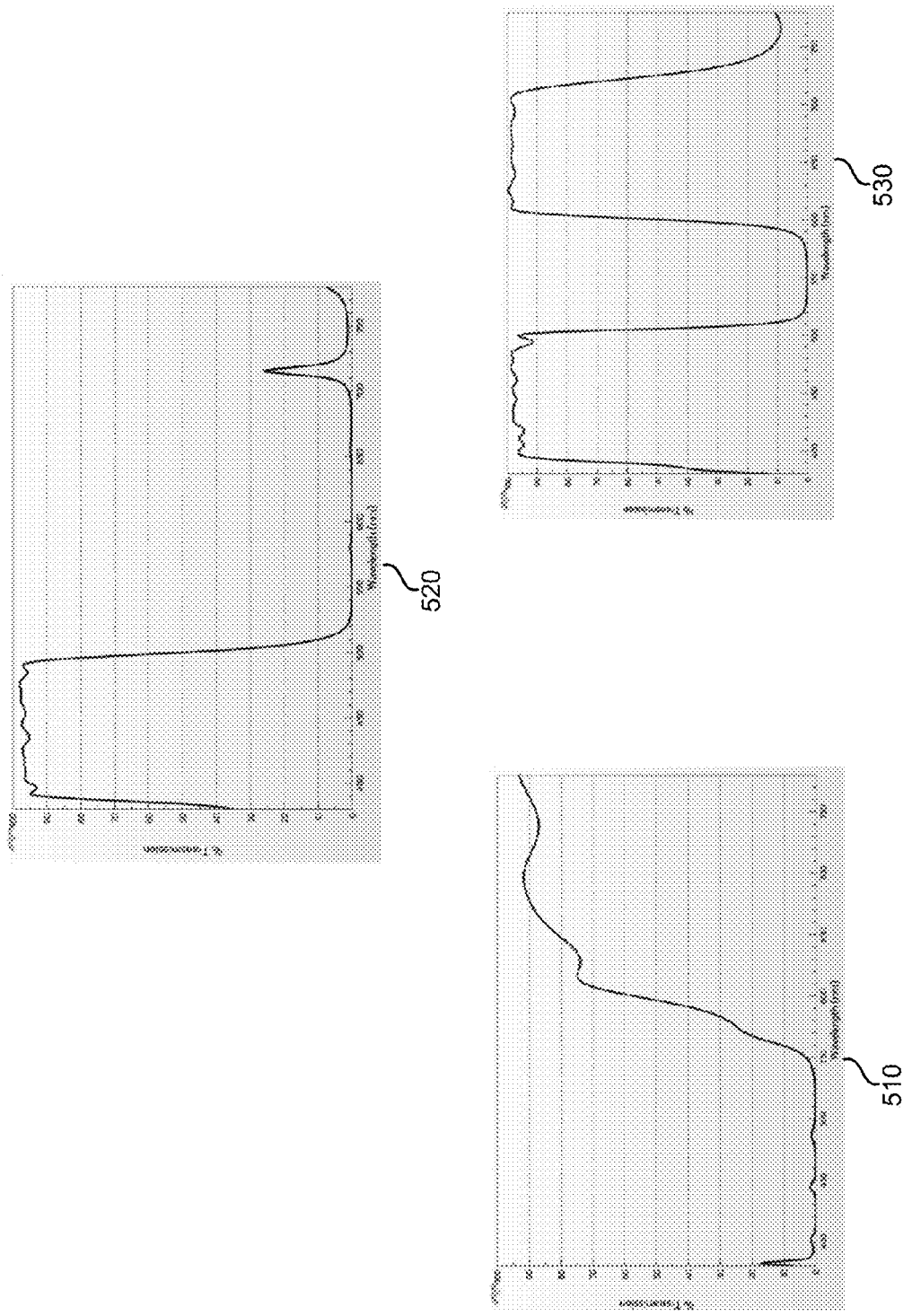
FIG. 5 illustrates transmission characteristics of multiple-waveband spectral filters in an exemplary embodiment.

FIG. 5 illustrates transmission characteristics of different multiple-waveband spectral filters in an exemplary embodiment. Plot 510 shows the transmission characteristics of a filter that transmits frequencies of green (G) and blue (B) light and attenuates frequencies of red (R) light. Plot 520 shows the transmission characteristics of a filter that transmits RG frequencies and attenuates B frequencies. Plot 530 shows the transmission characteristics of a filter that transmits RG frequencies and attenuates G frequencies.

Returning to the example imaging system 100 of FIG. 4, filter 120-1 transmits spectrum T1 to camera 440 and reflects spectrum R1 toward filter 120-2. That is, filter 120-1 transmits 50% of both the R and B waveband, while reflecting all of the G waveband and 50% of both the R and B waveband. Camera 440 receives light combined in the R and B wavebands. Filter 120-2 transmits spectrum R1×T2 to camera 444 and reflects spectrum R1×R2 to camera 442. That is, filter 120-2 receives light that has been reflected from filter 120-1 and transmits all of the incident R waveband and 50% of the incident G waveband. Light in the G and B wavebands are reflected from filter 120-2 to result in an image at camera 442. The combination of the reflecting filter properties of filter 120-1 and the transmitting properties of filter 120-2 result in an image at camera 444 comprised of the R and G wavebands.

In this example, imaging system 100 does not substantially discard light within any of the sensed wavebands, but routes light with different waveband combinations to different image planes and/or in different or orthogonal directions. Cameras 440-444 may be positioned to coincide at substantially identical virtual image planes associated with optical element 110. Pixel coordinates from each camera 440-444 may be registered relative to each other so that a sensed signal magnitude from each camera may be associated with a single location at the imaged scene 102. Thus, cameras 440-444 and filters 120 may be arranged to align such that different combinations of the spectrum from the same location in an imaged scene are incident on different sensor elements (e.g., pixels) or camera 440-444 at the same time or substantially the same time. Processor 150 (not shown in FIG. 4) may implement a processing model of imaging system 100 to determine, for example, the red, green, and blue spectral components of the image.

Figure 6:
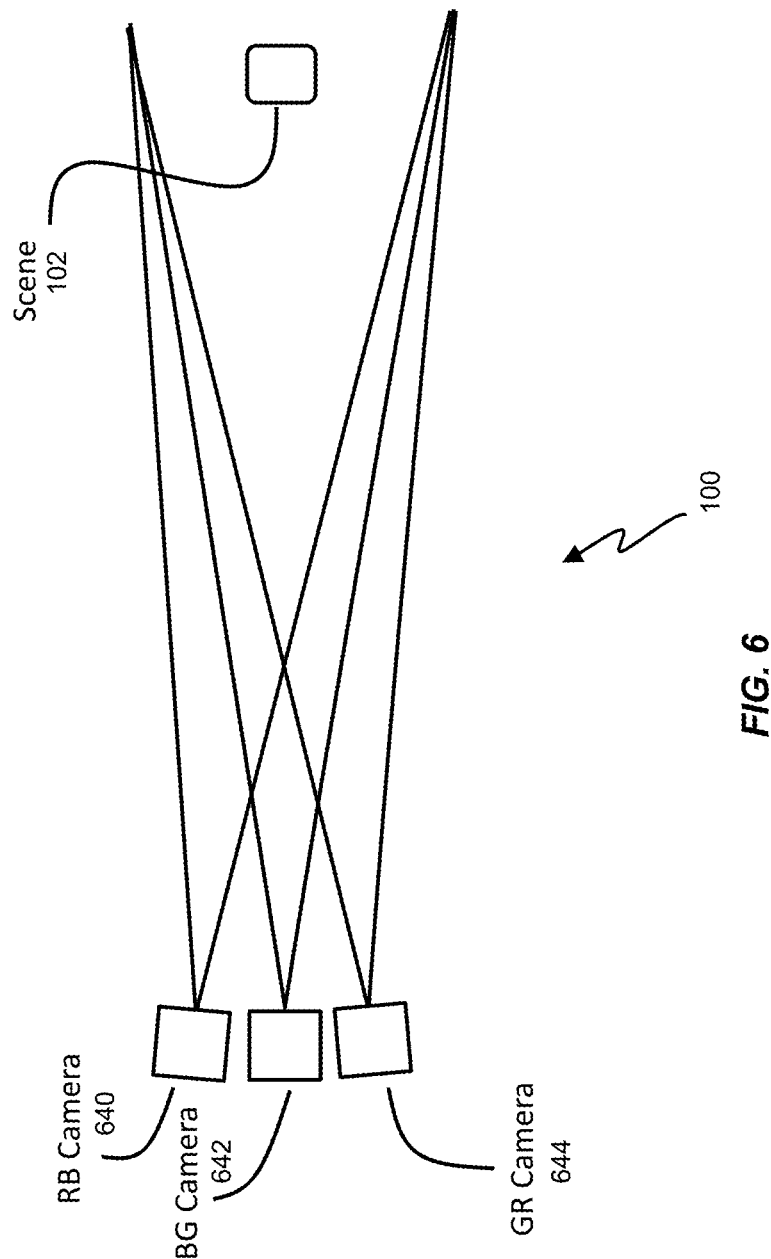
FIG. 6 is a block diagram of an imaging system in another exemplary embodiment.

Alternatively, for distant scenes, imaging system 100 may direct multiple separate cameras at the same scene. FIG. 6 is a block diagram of imaging system 100 in another exemplary embodiment. Here, imaging system 100 includes a RB camera 640 that detects images in the red and blue spectrum, a BG camera 642 that detects images in the blue and green spectrum, and a GR camera 644 that detects images in the green and red spectrum. In the example imaging system 100 of FIG. 6, each camera 640-644 is fitted with its own multi-waveband spectral profile filter and the cameras 640-644 are registered so that light from the same location in the scene that is detected by each of the cameras may be compared by processor 150.

Figure 7:
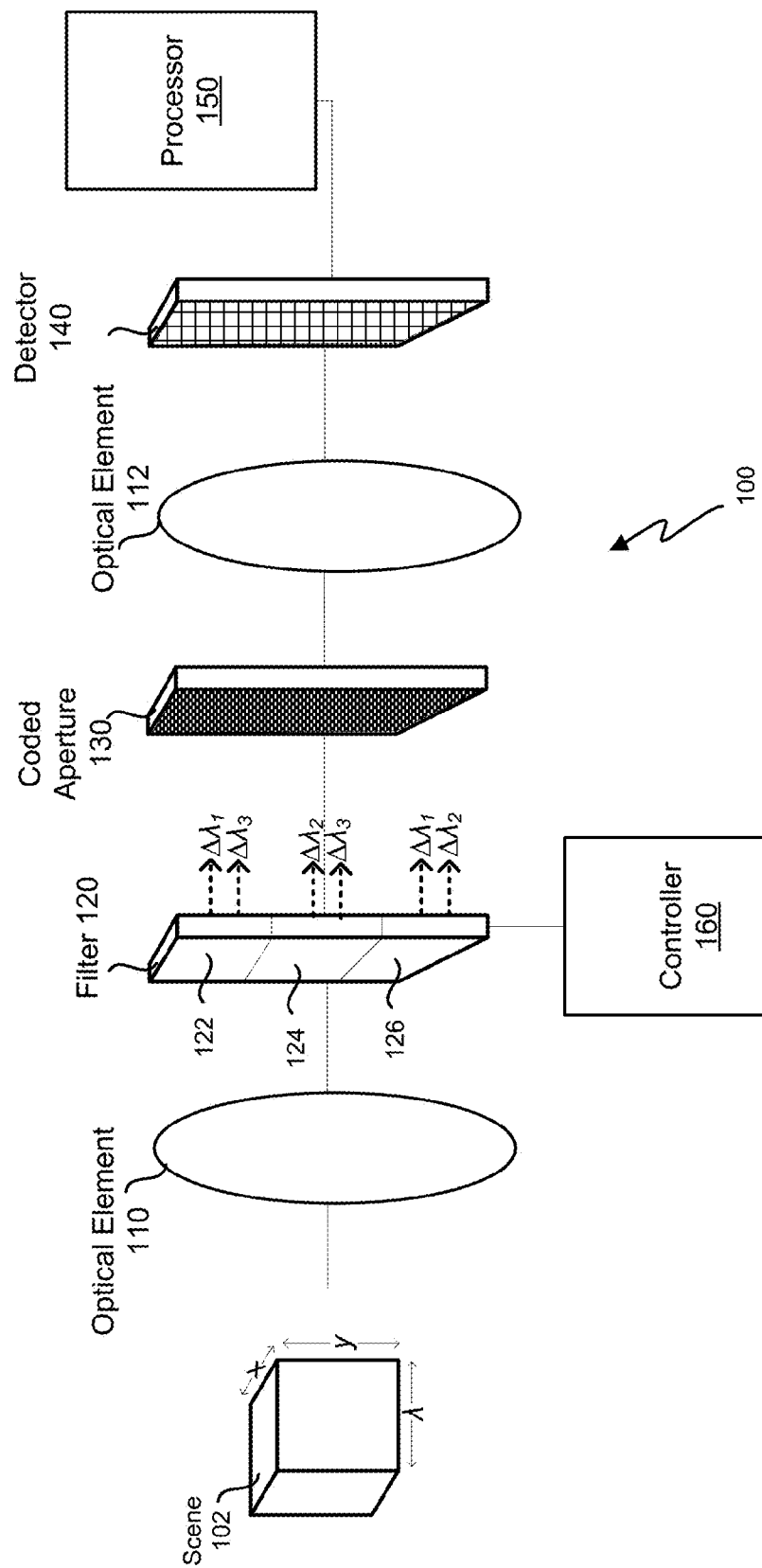
FIG. 7 is a block diagram of an imaging system in another exemplary embodiment.

FIG. 7 is a block diagram of imaging system 100 in yet another exemplary embodiment. As shown in FIG. 7, imaging system 100 may additionally include coded aperture 130 and/or optical element 112. Imaging system 100 may also include one or more dynamic filters 120 controllable by a driver such as controller 160.

Coded aperture 130 is any system, component, or device operable to provide aperture coding to multiplex images. Coded aperture 130 may comprise a coded matrix in the form of a two-dimensional pattern of sections, where each section may block or reflect some or all of the impinging electromagnetic energy to accomplish a transform of the spectral data within each of the transmitted wavebands. Coded aperture 130, either alone or in combination with other devices such as optical element 112, may generate a dispersed mask image comprising multiple images of the coded aperture corresponding to the different transmitted wavebands. Thus, coded aperture 130 and/or optical element 112 may include a dispersive element (not shown) to induce a wavelength-dependent spatial shift of the multiple wavebands so that the transmitted wavebands may be spatially dispersed onto detector 140.

Detector 140 may comprise a two-dimensional detector array of detector elements, where each column in the array includes linear combinations of columns of coded aperture 130 that depend on the spectrum of the source. A single detector element, or pixel, may measure multiple spatially overlapped or simultaneously transmitted wavebands. Processor 150 may retrieve the spectrum of each pixel of a hyperspectral image using mathematical properties of filter 120, coded aperture 130, and/or detector 140. Thus, the algorithms or processing of decoding a multiplexed waveband at a single detector element may be dependent on the particular design of imaging system 100. Processor 150 may perform a transformation of the data matrix to produce a reconstructed spectral image that mathematically represents the optical spectrum of source 102.

It will be appreciated that imaging system 100 may incorporate any combination of the exemplary embodiments described and shown herein. For instance, imaging system 100 may incorporate a static filter approach, a dynamic filter approach, or some combination thereof. Additionally, alternative arrangements, combinations, and number of filters 120, profiles 122-126, and/or cameras 440-444 are possible as well as alternative ranges of electromagnetic energy. For example, the concepts described herein may apply to detection of other filterable energy fields such as acoustic energy, and particle detection, as well as other electro-magnetic energy fields such as radio waves, terahertz radiation, x-rays, and millimeter waves. For particle detection, filtered parameters may include mass, spin, electrical or magnetic moments, or energy. Furthermore, though imaging system 100 of the exemplary embodiments may be described and shown herein as having a particular physical order and location of components, it will be appreciated that designs with alternative orders, respective locations of elements, and/or with a fewer or greater number of components are possible.

EXAMPLE

For the purposes of discussion and analysis that follows, consider that filter 120 of FIG. 1 comprises an acousto optical tunable filter (AOTF). In an AOTF, a radio frequency (RF) input applied to a transducer controls the transmitted radiation intensity level of filter 120. Imaging system 100 may thus include or be communicatively coupled with a controller (e.g., controller 160) that varies the RF frequency corresponding to the desired wavelength range to acquire a complete spectrum for analysis.

Filter 120 may transmit multiple, discrete wavebands by driving the AOTF at multiple spaced frequencies. Alternatively or additionally, each spectral profile 122-126 of filter 120 may be segmented into discrete zones which are independently controlled by one or more AOTF transducers (e.g., controller(s) 160). Thus, imaging system 100 may select multiple wavebands (or colors) simultaneously.

The image formation process far the image $i^{th}$ image in a sequence of images can be described quite generally by the linear superposition integral $$I_i(u,v) = \int_{t_i}^{t_{i+1}} \int_{\lambda_0}^{\lambda_1} \int_{\eta_0}^{\eta_1} \int_{\xi_0}^{\xi_1} PSF(u-\xi, v-\eta, \lambda) U_0(\xi,\eta,\lambda,t) \times S(\lambda,t)T(t)d\xi d\eta d\lambda dt + n_i(u,v),$$

Equation (1):

where $I_i(u, v)$ is the image formed by the imaging system at focal plane coordinates (u, v) at time interval $t_i \leq t \leq t_{i+1}$, $PSF(u-\xi, v-\eta, \lambda)$ is the system point spread function (PSF), $U_0(\xi, \eta, \lambda, t)$ is the object being imaged at the object coordinates $(\xi, \eta)$ at a given wavelength $\lambda$ and which may depend on time for non-static scenes, $S(\lambda, t)$ is the spectral response of the detector which may change in time (e.g., filter 120 comprises an AOTF and the spectral response is tunable), and T(t) is the temporal response of the detector. Here, we may take T(t)=1 while the shutter is open and T(t)=0 when the shutter is closed, thus we can remove the T(t) term from the integral and simply use the limits of the time integration to account for an open and closed shutter. Though the wavebands may be discussed herein with respect to models of evenly spaced spectral bands for convenience of discussion, it will be appreciated that imaging system 100 may select wavebands of alternatively spaced spectral bands.

The limits of the integration extend over the field of view of the camera for $\epsilon$ and $\eta$, over the spectral bandpass of the detector (e.g., 450-800 nm for a visible band camera), and the time integral extends over the integration time of the camera $T = t_{i+1} - t_i$. The variable $n_i(u, v)$ denotes the noise in the $i^{th}$ image such as shot noise, dark current noise, read out noise, etc. Here, assume that the noise is additive and that the PSF in Eq. (1) is written in the space-invariant form for simplicity. To further simplify, the scene $U_o$ may considered independent of time. Additionally, the spectral filter may be assumed constant during the time period that the shutter is open (i.e., when $t_i \leq t \leq t_{i+1}$). The spectral features of Eq. 1 may be defined as $$U'_o(u,v,\lambda) = \int_{t_i}^{t_{i+1}} \int_{\lambda_0}^{\lambda_1} \int_{\eta_0}^{\eta_1} \int_{\xi_0}^{\xi_1} PSF(u-\xi, v-\eta, \lambda) U_0(\xi,\eta,\lambda) d\xi d\eta d\lambda dt$$

Equation (2):

This definition along with the simplifications just mentioned allows Eq. (1) to be rewritten as $$I_i(u,v) = \int_{t_i}^{t_{i+1}} \int_{\lambda_0}^{\lambda_1} \int_{\eta_0}^{\eta_1} U'_o(u,v,\lambda) S(\lambda) d\lambda + n_i(u,v),$$

Equation (3):

where $S_i(\lambda) = S(\lambda, t_i)$ is the spectral filter used for the $i^{th}$ image.

Previous systems implement a narrow band spectral response such that $S_i(\lambda) \approx \delta(\lambda - \lambda_i)$. In that case, the imager may take N snap shots for differing values of $\lambda_i$ to build a discrete approximation of $U'_o(u, v, \lambda)$ with N spectral bands. A standard color camera operates in such a way with N=3 and $\lambda_i$ is chosen to be red, green, and blue (RGB). Because the RGB spectral bands are well separated one can have fairly broadband filters which allow a sufficient amount of light to the detector without much overlap between the spectral transmission lines. However if high spectral resolution is desired (e.g. such as for hyperspectral imaging applications), the spectral filters may be narrow so as to not overlap and not cause a lot of spectral blurring. This restricts the amount of light reaching the sensor and lowers the signal to noise (SNR).

Here, imaging system 100 captures multiples images $I_i(u, v)$ with a tunable filter 120 in order to determine the datacube (two space and one spectral dimension) $U'_o(u, v, \lambda)$ defined in Eq. (2). A tunable filter may be modeled as $$S_i(\lambda) = \sum_{j=0}^{N-1} q_{ij} \delta(\lambda - \lambda_j) * g(\lambda),$$

Equation (4):

where $q_{ij}$ is an M×N (e.g., M=N) matrix consisting only of 1s and 0s implying whether passband is present or not present respectively, $\delta(\lambda - \lambda_j) * g(\lambda)$ is a delta function convolved with a Gaussian or similar shaped function, $g(\lambda)$, that models the passband of the spectral filter, and $\lambda_j$ is the center frequencies of each passband in the filter. Substituting the expression into Eq. (3) gives us $$I_i(u,v) = \sum_{j=0}^{N-1} q_{ij} U''_o(u,v,\lambda_j) + n_i(u,v),$$

Equation (5):

where $U''_o(u, v, \lambda) = U'_o(u, v, \lambda) * g(\lambda)$, is the original datacube spectral convolved with the filter passband function $g(\lambda)$. Thus, Eq. (5) is a matrix equation for the spectrum at a given spatial coordinate (u, v) on a two-dimensional array of detector 140. Here, detector 140 may comprise a charge-coupled device (CCD) sensor, a silicon based complementary metal-oxide-semiconductor (CMOS) sensor, or other types of sensors. Filter 120 may implement a pattern that defines each column of an invertible coding matrix. To solve for the spectral datacube, imaging system 100 takes a sequence of images with different filters such that $q_{ij}$ is invertible. Because there are multiple passbands transmitted through filter 120 (and coded aperture 130 if implemented), the same spectral line is measured multiple times at an element of detector 140. Processor 150 may invert the matrix is inverted to solve for the spectral datacube. In the process of inverting the matrix, each of the multiple measurements add together for a $\sqrt{N}$ improvement in SNR.

Suppose, in one embodiment, that a filter is chosen for the image $I_{i+j}(u, v)$ to be a circularly shifted version of the filter $I_i$. Then the matrix $q_{ij}$ is a circulant matrix such that $q_{ij} = q_{j-i \pmod N}$. The main advantage of using circulant matrices, is that their inverse is known, and may be quickly calculated using Fourier transforms. Thus, processor 150 may use discrete Fourier transform processing to demodulate the signal to determine, in real time, the intensity of each line of radiation reflected onto an element of detector 140.

The solution estimate for $U''_o(u, v, \lambda_j)$ in Eq. (5) is $$U_{est}(u, v, \lambda_l) = \frac{1}{N} \sum_{j=0}^{N-1} \sum_{k=0}^{N-1} \frac{I_k(u, v)}{\psi_j} e^{-2\pi i(k-1)j/N}$$

Equation (6)

where Equation (7): $\psi_j \Sigma_{m=0}^{N-1} q_m e^{2\pi i m j/N}$ is the inverse discrete Fourier transform of one row of the matrix, which are also the eigenvalues of the circulant matrix. The estimator is obtained by inverting the matrix q in Eq. (5). The estimator would be exact in the absence of noise.

Suppose, in another embodiment, that the filter may be further defined such that not only is the matrix $q_{ij}$ of coded aperture 130 circulant but it is also a quadratic residue sequence (QRS). For quadratic residues there exists a basic function $$r_i = \frac{2}{N+1}(2q_i - 1)$$

such that $$\Sigma_{i=0}^{N-1} q_i r_{i-j} = \delta_{ij}. \quad \text{Equation (8):}$$

Processor 150 may use this identity to estimate the datacube $U''_o(u, v, \lambda_j)$ in Eq. (5) by the operation $$U_{est}(u,v,\lambda_j) = \Sigma_{i=0}^{N-1} I_i(u,v) r_{i-j} = U''_o(u,v,\lambda_j) + \Sigma_{i=0}^{N-1} n_i(u,v) r_{i-j}, \quad \text{Equation (9):}$$

Quadratic residue sequences are discrete sequences that are binary, positive functions containing only ones and zeros of roughly equal number. Thus, a QRS may describe the transmission profile of approximately 50% transmissivity. However, because QRS have the property shown in Eq. (9), they may be easily inverted so that they act as a single filter with the spectral resolution of the smallest open element. Additionally, the matrix is well conditioned and the noise is not severely amplified.

Figure 8:
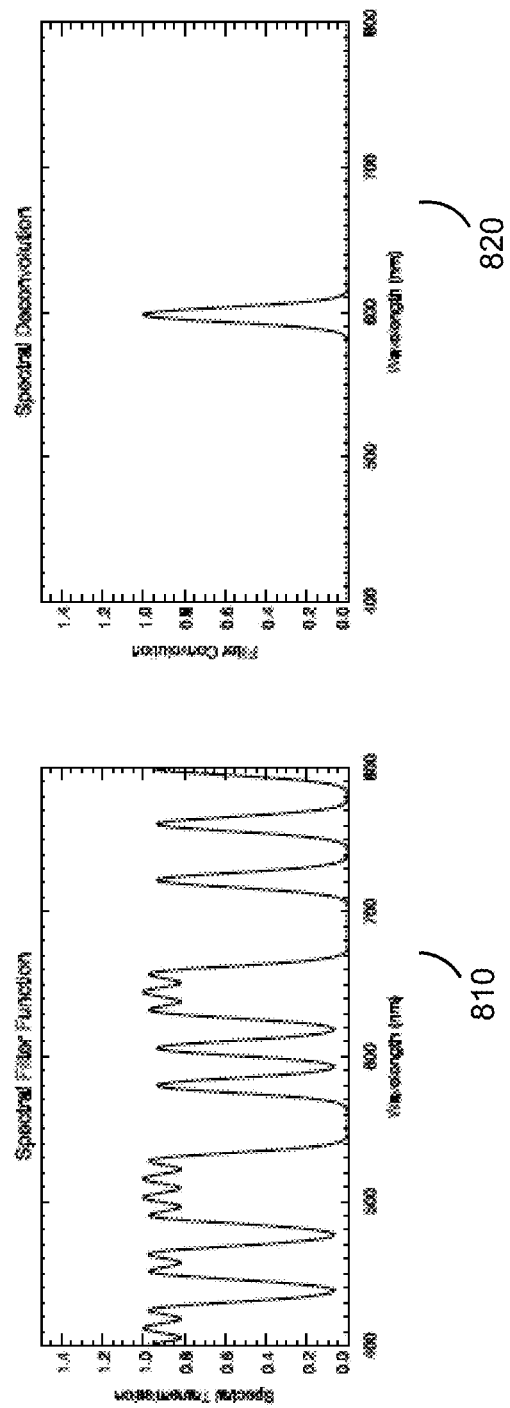
FIG. 8 illustrates a QRS sequence and the result of convolving the QRS sequence with its deconvolution kernel.

FIG. 8 illustrates a QRS sequence and the result of convolving the QRS sequence with its deconvolution kernel. Plot 810 shows a graph of a length 31 QRS filter convolved with a 5 nm width Gaussian. The QRS sequence is expanded to a discrete grid 310 units long, and convolved with a Gaussian with a standard deviation of 5 nm. This mimics the filter properties of an Acousto Optical Tunable Filter. Plot 820 shows the result of convolving the length 31 QRS filter function with its deconvolution kernel $r_i$, as described in Eq. (8). The result is the Gaussian filter function of standard deviation of 5 nm, which is the same function that was convolved with the original sequence.

To solve for the spectral datacube when using tunable filter 120 and circulant QRS coded aperture 130, processor inverts the matrix $q_{ij}$. If the matrix is ill-conditioned then the act of inverting Eq. (5) may amplify the noise and eliminate the SNR gain we expect from taking multiple images of the same spectral band. To see the effects that noise has on the signal estimation process we may substitute Eq. (5) into Eq. (6). The estimate for the spectral datacube in the presence of noise is $$U_{est}(u, v, l\lambda_m) = \quad \text{Equation (10)}$$

$$U''_o(u, v, \lambda_j) + \frac{1}{N}\sum_{j=0}^{N-1}\sum_{k=0}^{N-1}\psi_j^{-1}e^{-2\pi i(k-l)j/N}n_k(u, v).$$

Assuming that all the noise terms are independent Gaussian processes with mean zero allows us to calculate the total variance of the signal estimate in Eq. (10) as:

$$\sigma_{est}^2 = \frac{1}{N^2}\sum_{j=0}^{N-1}\sum_{k=0}^{N-1}|\psi_j|^{-2}\sigma_k^2, \quad \text{Equation (11)}$$

where $\sigma_k^2 = E[n_k(u,v)^2]$ and $E[\ldots]$ implies the expectation value obtained after a series of many measurements. The functional dependence on (u,v) is dropped for ease of notation.

Up until now the noise has been kept entirely general. However in an imaging system different types of noise are present. In its simplest form, the noise can be broken up into camera specific noise such as read out noise, dark current, etc. and photon noise or shot noise. The variance in Eq. (11) can thus be written as $$\sigma_{est}^2 = \frac{1}{N^2}\sum_{j=0}^{N-1}\sum_{k=0}^{N-1}|\psi_j|^{-2}[\sigma_{cam}^2 + \sigma_{k,SN}^2], \quad \text{Equation (12)}$$

where $\sigma_{cam}^2$ is the variance of the camera noise (and does not depend on the index k since it is constant) and $\sigma_{k,SN}^2$ is the variance of the shot noise. This does depend on the index k since the shot noise can vary from image to image as it depends explicitly on the number of photon collected. In other words, imaging system 100 may change filter 120 for different images, thereby inducing the number of photons collected changes and affecting the shot noise. However for broadband sources, this variation is small.

Eq. (12) may be simplified by assuming a broadband scene such that the number of photons collected from image to image is roughly constant. This allows us to take $\sigma_{k,SN}^2 \approx \overline{\sigma_{SN}^2}$ where the overbar denotes some average value. The noise estimate may be bounded by taking $|\psi_j| = |\psi_{min}|$. These simplifications give $$\sigma_{est}^2 \lesssim \frac{K^2}{n^2}[\sigma_{cam}^2 + \overline{\sigma_{SN}^2}], \quad \text{Equation (13)}$$

where $$K = \frac{|\psi_{max}|}{|\psi_{min}|}$$

is the spectral condition number using the fact that $\psi_{max} = \Sigma_{i=0}^{N-1} c_i = n$ for a binary circulant matrix, where n is the number of 1s in a row of the circulant matrix.

The variance term on the left had side of Eq. (13) is the variance of the signal estimate for a particular spectral band, while the terms on the right hand side are variances of the image noise which contain noise from all wavelength bands, and thus depend on the kind of filter used. To compare the performance of this approach to the performance of a single passband filter we will to convert the variance terms on the right hand side of Eq. (13) into terms that contain no explicit dependence on the type of filter used. The camera noise is always constant, and thus the noise is independent of the filter. However, the shot noise varies depending on how many photons reach the focal plane array, and that depends on how many spectral lines are open in filter 120. Assuming simple relationship where the image shot noise is related to the total shot noise in the form $$\sigma_{SN}^2 \approx \frac{n}{N}\sigma_{TSN}^2, \qquad \text{Equation (14)}$$

where $\sigma^2_{TSN}$ is the total shot noise if no filter was present and the filter function $S(\lambda)=1$. This is the limiting case of a broadband panchromatic camera. Thus, Eq. (13) becomes $$\sigma_{est}^2 \lesssim \frac{K^2}{n_2}\left[\sigma_{cam}^2 + \frac{n}{N}\sigma_{TSN}^2\right]. \qquad \text{Equation (15)}$$

Compare this result to the noise one obtained using a simple passband filter. In that case the noise is $$\sigma_{PB}^2 = \sigma_{cam}^2 + \frac{1}{N}\sigma_{TSN}^2. \qquad \text{Equation (16)}$$

The gain G is defined as a ratio of the two SNR terms $G=SNR_{est}/SNR_{PB}=\sigma_{PB}/\sigma_{est}$, where the second equality comes from the fact that the signal at a given band is equal in both the passband and coded filter cases. The ratio G is then $$G = \frac{n(N\chi^2+1)^{1/2}}{K(N\chi^2+n)^{1/2}}, \qquad \text{Equation (17)}$$

where $\chi^2=\sigma^2_{cam}/\sigma^2_{TSN}$ is the ratio of the camera to total shot noise variance. The goal is to create filters such that $G>1$ which implies that imaging system 100 with tunable filter 120 and circulant QRS coded aperture 130 gives a higher SNR than a single passband filter. Here, G is inversely proportional to the condition number K as expected, matrices with a low condition number are desirable. However, it is also desirable for the ratio n/N to be as close to 1 as possible, to obtain a highest possible SNR for each measurement. Unfortunately these two limits cannot coincide since the condition number of a matrix typically scales as sparsity decreases (i.e., as the number of 0's in the matrix goes down, the condition number goes up). To obtain an analytic result, that has the optimal SNR when $\chi>1$, imaging system 100 implements a quadratic residue filter. The condition number K is known and given by $K=\sqrt{2n}$, and n is related to N as $n=(N+1)/2$. Thus the gain G is given by $$G = \left[\frac{(N+1)(N\chi^2+1)}{2(2N\chi^2+N+1)}\right]^{1/2} \xrightarrow{N\gg1} \sqrt{N}\left(\frac{\chi^2}{4\chi^2+1}\right)^{1/2}. \qquad \text{Equation (18)}$$

The final limit for large N shows that, for imaging system 100 which implements a quadratic residue filter with a large number of spectral bands, the standard deviation of the noise is reduced relative to the single passband case by a factor of $\sqrt{N}$. In addition, this advantage increases as the signal becomes weaker, because G becomes larger for large values of $\chi$.

Figure 9:
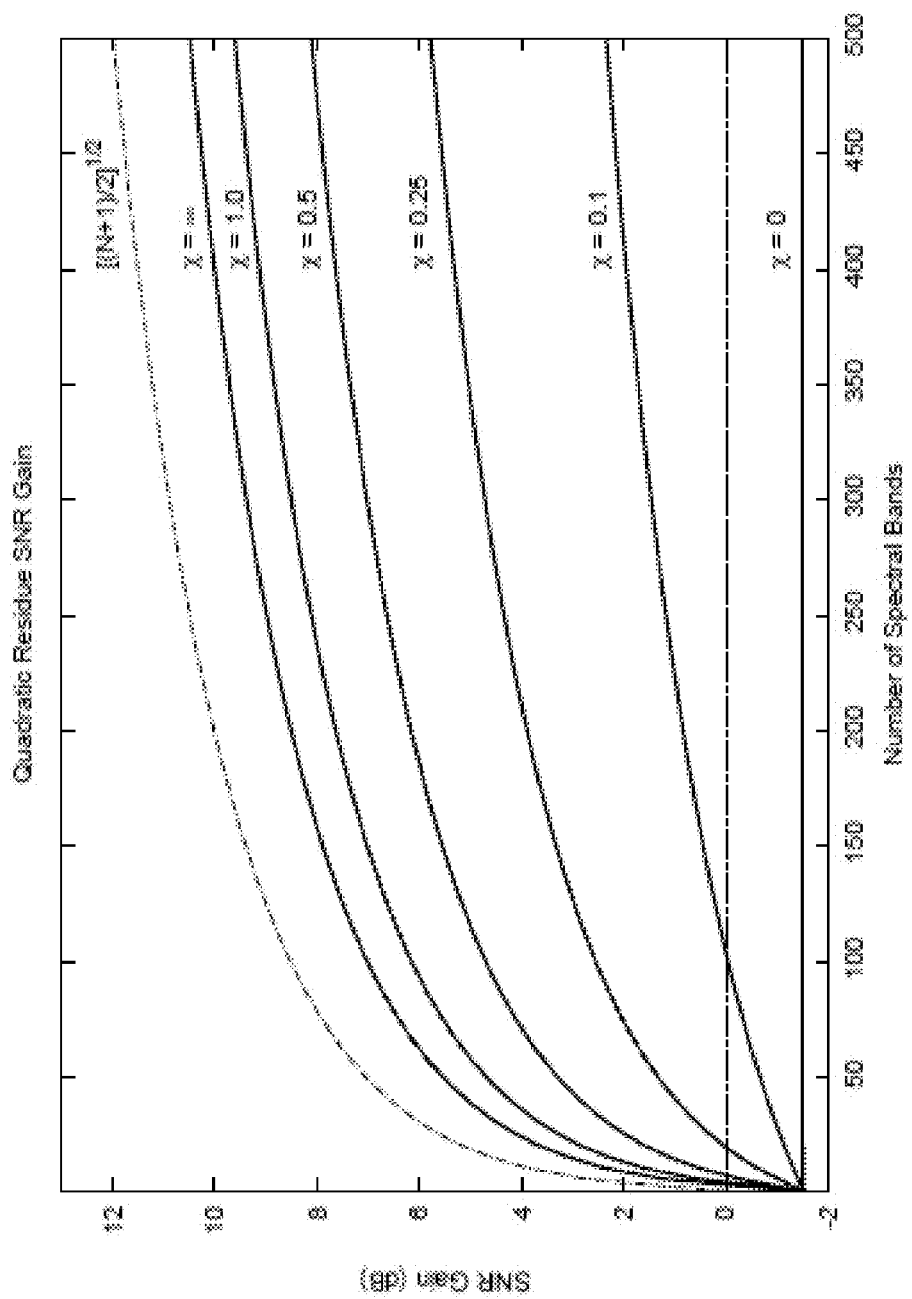
FIG. 9 illustrates a graph of the gain ratio for a variety of values.

FIG. 9 illustrates a graph of the gain ratio given in Eq. (18) for a variety of values of $\chi$. FIG. 9 shows that the gain in dB is typically greater than 0 implying that imaging system 100 is an improvement over a passband approach. As seen in the graphic, the improvement is best for large values $\chi$. Consider the gain improvement for large values of $\chi$. The standard deviation is reduced in the multiple passband case by a factor of $\sqrt{N}$ relative to the single passband case because multiple images of the same spectral line are taken and averaged together in the process of taking the matrix inverse. Since the noise is additive Gaussian noise, the standard $\sqrt{N}$ reduction in standard deviation is achieved. Shot noise is slightly more subtle, but the net payoff is the same.

Since more filter bands are open in imaging system 100, each image has more shot noise than if a single passband was used, but the signal does not increase, since the added signal and shot noise is at wavelength s different from the signal of interest. This adds noise by a factor of $\sqrt{N}$ eliminating the advantage one gains by adding N images of the same spectral line together. However, as the number of bands increases the shot noise per spectral band must decrease. Since a fixed amount of light is divided up amongst more spectral bands for a single passband filter, imaging system 100 still gains an SNR improvement by a factor of $\sqrt{N}$ since the spectrum is divided among fewer spectral bands.

Consider also a comparison of imaging system 100 which implements a quadratic residue spectral filter to that of a simple panchromatic camera with no spectral information. Panchromatic imagers have the best SNR characteristics of any camera, and are useful for remote sensing when low photon flux limits the ability to obtain spectral information. The shot noise variance in the panchromatic camera has already been defined as $\sigma^2_{TSN}$, and the camera noise variance, $\sigma^2_{cam}$ will stay the same (assuming an identical camera is used). The approximation in Eq. (14) relates the shot noise in a given spectral band to the total shot noise available. Because the signal and shot noise are related by Poisson statistics, the same estimate t may be used to relate the total signal in a panchromatic imager to the signal at a given spectral line such that $s_{pc}=(N/n)\overline{s_i}$. Here $s_{pc}$ is the signal of a panchromatic imager, and $\overline{s_i}$ is the average signal at a spectral line $\lambda_i$. Under these conditions the SNR gain is $$G = \sqrt{\frac{N+1}{2N}}\left(\frac{\chi^2+1}{2N\chi^2+N+1}\right)^{1/2} \xrightarrow{N\gg1} \frac{1}{\sqrt{2N}}\left(\frac{\chi^2+1}{2\chi^2+1}\right)^{1/2}. \qquad \text{Equation (19)}$$

Thus we see that the panchromatic imager does indeed have better SNR than imaging system 100 in this case. While imaging system 100 has a lower SNR than a panchromatic imager, it provides a $\sqrt{N}$ improvement in the signal to noise over a single passband filter. Imaging system 100 thus provides the ability to do hyperspectral imaging in a relatively low light environment. Imaging system 100 also enables use of a high speed shutter to image transient events or to have very high spectral resolution (many spectral bands).

Three Band Multiplexed Spectral Imager Embodiment

Consider, for the purposes of the discussion to follow, that imaging system 100 implements a three band multiplexed spectral imager. As described in greater detail below, processor 150 may further improve the gain by exploiting correlation properties of the noise and a priori information about the scene being imaged. Further assume for this example that imaging system 100 or filter 120 implements or comprises a quadratic residue filter. To simplify the notation consider just one pixel of detector 140, and denote the measurement at this pixel by $m_i$. To relate this to the imaging equation given in Eq. (5), $m_i=I_i(u, v)$ and $s_i=U''_o(u, v, \lambda_i)$ for a specific value of $(u, v)$.

The measurement comprises the signals at the various spectral bands denoted by $s_i$ and noise denoted by $n_i$. Imaging system 100 takes three measurements $$m_1 = s_1 + s_2 + n_1$$

$$m_2 = s_2 + s_3 + n_2$$

$$m_3 = s_1 + s_3 = n_3 \qquad \text{Equation (20):}$$

The estimators for the signals are given in Eq. (10), and in the three band case they simplify to $$e_1 = \frac{1}{2}(m_1 - m_2 + m_3) = s_1 + \frac{1}{2}(n_1 - n_2 + n_3) \qquad \text{Equation (21)}$$

$$e_2 = \frac{1}{2}(m_1 + m_2 - m_3) = s_2 + \frac{1}{2}(n_1 + n_2 - n_3)$$

$$e_3 = \frac{1}{2}(-m_1 + m_2 + m_3) = s_3 + \frac{1}{2}(-n_1 + n_2 + n_3)$$

The variance of each estimate in Eq. (21) is the same, and is given by $$\sigma_e^2 = \frac{1}{4}(\sigma_1^2 + \sigma_2^2 + \sigma_3^2). \qquad \text{Equation (22)}$$

In the case where the variance of each measurement is the same (e.g., when camera noise dominates shot noise) this simplifies to $$\sigma_e^2 = \frac{3}{4}\sigma^2.$$

This is the previous best case.

The noise terms of Eq. (21) are anti-correlated. The process of adding $m_1 + m_2 + m_3$ results in various noise terms cancelling each other because of this anti-correlation. Thus, if imaging system 100 performs measurements in anti-correlated noise then multiple measurements of the signal will give an SNR increase that is greater than the standard $\sqrt{N}$ increase because of this noise-canceling effect. Previous imaging systems are unable to exploit this anti-correlation since the signal is not known.

Imaging system 100 is also enhanced to use a priori information to exploit this anti-correlation. Even though the signal is unknown, imaging system 100 may use a priori information of the ratios between various signals. Assuming the ratios between signals are obtained, the signals may be represented as $s_2 = \alpha_2 s_1$ and $s_3 = \alpha_3 s_1$. To find the optimal estimate such that the variance is minimized, define $$\hat{e}_1 = w_1 e_1 + w_2 e_2 + w_3 e_3 = \qquad \text{Equation (23)}$$

$$(w_1 + w_2 \alpha_2 + w_3 \alpha_3) s_1 + \frac{w_1}{2}(n_1 - n_2 + n_3) +$$

$$\frac{w_2}{2}(n_1 + n_2 - n_3) + \frac{w_3}{2}(-n_1 + n_2 + n_3),$$

where $w_i$ is a weighting factor with the constraint that $w_1 + w_2\alpha_2 + w_3\alpha_3 = 1$, so that $\hat{e}_1$ is in fact an estimator for $s_1$. A similar definition and operation could be performed for $\hat{e}_2$ or $\hat{e}_3$ but no generality is lost since we assume that we know the ratios between the various signals that we seek to estimate.

The variance of $\hat{e}_1$ is given by $$\sigma_{\hat{e}}^2 = \frac{\sigma_1^2}{4}(w_1 + w_2 - w_3) + \qquad \text{Equation (24)}$$

$$\frac{\sigma_2^2}{4}(-w_1 + w_2 + w_3) + \frac{\sigma_3^2}{4}(w_1 - w_2 + w_3).$$

The variance of this estimator may be minimized subject to the constraint that $w_1 + w_2\alpha_2 + w_3\alpha_3 = 1$. This results in a function $$f(w_1, w_2, w_3) = \sigma_{\hat{e}}^2 + \lambda(w_1 + w_2\alpha_2 + w_3\alpha_3 - 1), \qquad \text{Equation (25):}$$

where $\lambda$ is the Lagrange multiplier. The minimization of this function results in a system of four equations and four unknowns (3 for the w's and 1 for the constraint). The solutions are $$w_1 = \frac{1}{D}(\sigma_1^2\sigma_2^2 + \sigma_2^2\sigma_3^2 + \alpha_2\sigma_2^2\sigma_3^2 + \alpha_3\sigma_1^2\sigma_2^2) \qquad \text{Equation (26)}$$

$$w_2 = \frac{1}{D}(\sigma_2^2\sigma_3^2 + \alpha_2(\sigma_1^2\sigma_3^2 + \sigma_2^2\sigma_3^2) + \alpha_3\sigma_1^2\sigma_3^2)$$

$$w_1 = \frac{1}{D}(\sigma_1^2\sigma_2^2 + \alpha_2\sigma_1^2\sigma_3^2 + \alpha_3(\sigma_1^2\sigma_1^2 + \sigma_1^2\sigma_3^2))$$

where D is given by $$D = (1+\alpha_2)^2\sigma_2^2\sigma_3^2 + (\alpha_2+\alpha_3)^2\sigma_1^2\sigma_3^2 + (1+\alpha_3)^2\sigma_1^2\sigma_2^2, \qquad \text{Equation (27):}$$

These solutions yield a variance for the estimator in Eq. (23) of $$\sigma_{\hat{e}}^2 = \frac{\sigma_1^2\sigma_2^2\sigma_3^2}{D}. \qquad \text{Equation (28)}$$

If all variances are equal and if $\alpha_2 = \alpha_3 = 1$, then Eq. (28) simplifies to $$\sigma_{\hat{e}}^2 = \frac{\sigma^2}{12}.$$

This is a dramatic improvement over the previous best case of $$\sigma_{\hat{e}}^2 = \frac{3}{4}\sigma^2,$$

and a significant improvement over what one would achieve by measuring the signal 3 times.

Figure 10:
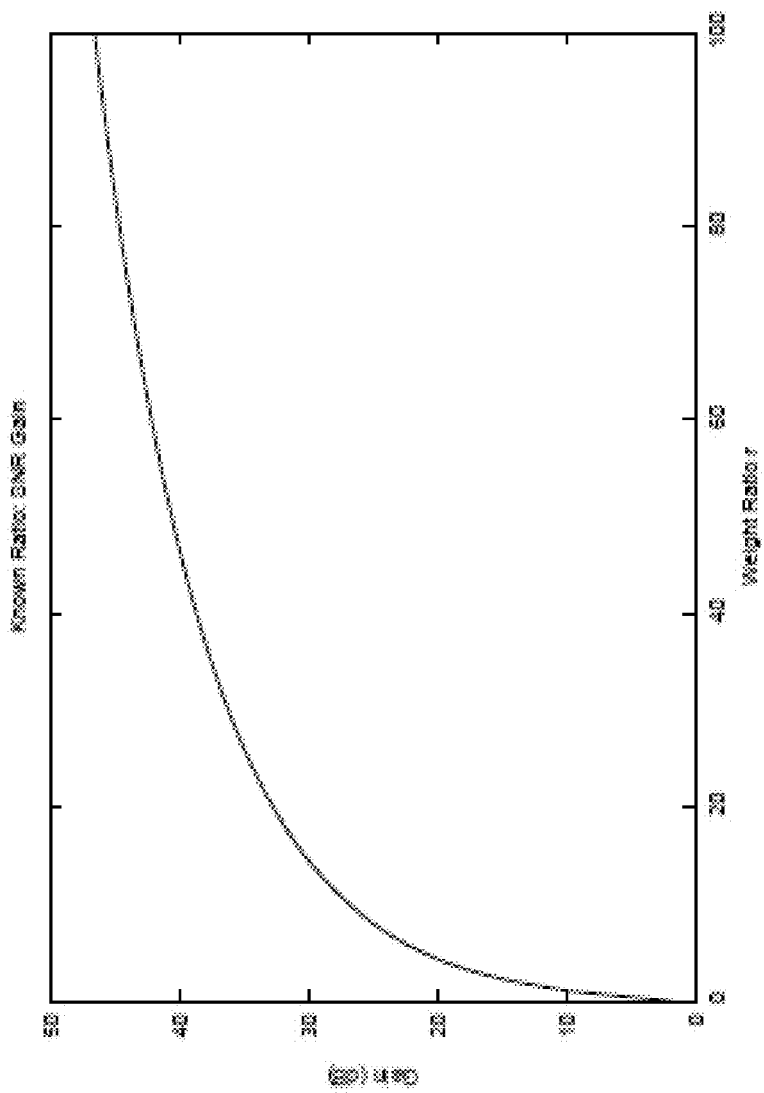
FIG. 10 is a graph that illustrates the SNR gain when exploiting the anti-correlated nature of the noise.

FIG. 10 is a graph that illustrates the SNR gain when exploiting the anti-correlated nature of the noise. The horizontal axis is the ratio $r = \alpha_2 = \alpha_3$ and the vertical axis is the gain in dB calculated as 10 log G. The results show that using the estimator in Eq. (23) results in a dramatic improvement in SNR over the estimator of Eq. (21).

Unfortunately in practice it is difficult to know the ratios $\alpha_2$ and $\alpha_3$ exactly. In fact, if the estimates for the signals given in Eq. (21) are used to calculate the ratios, such that $\alpha_2 = e_2/e_1$ and $\alpha_3 = e_3/e_1$ then these estimates combined with Eqs. (23) and (26) simply give $\hat{e}_1 = e_1$. In other words, the new estimator for the signal is no better than our initial estimator. This makes sense since no additional information has been obtained in this instance, and the initial assumption that the ratios have been obtained has been ignored.

To gain the dramatic improvement implied by Eq. (28), processor 150 may obtain a better measure for the ratios. In practice, a scene has spatial correlations. Thus, the spectrum of a given pixel in a scene is correlated to the spectrum of its neighboring pixels. Imaging system 100 may use this correlation information to generate a better estimate of the spectral ratios.

Assume that the spectral lines are related in the following way: $s_2 = \alpha_2 s_1 + \in_2$ and $s_3 = \alpha_3 s_1 + \in_3$ where $\in_i$ is an error parameter that is included if the estimate of $\alpha_i$ is not exactly correct. Further assume that $\in_i$ is a Gaussian random variable with zero mean and variance $\sigma^2 \epsilon$. Also, take the variance of $\in_i$ equal for all i for notational simplicity. Just as before, a general estimate of signal 1 may defined as $$\hat{e}_1 = w_1 e_1 + w_2 e_2 + w_3 e_3 = (w_1 + w_2 \alpha_2 + w_3 \alpha_3) s_1 + \frac{w_1}{2}(n_1 - n_2 + n_3) + \frac{w_2}{2}(n_1 + n_2 - n_3 + 2\in_{21}) + \frac{w_3}{2}(-n_1 + n_2 + n_3 + 2\in_{31}),$$

Equation (29)

whose variance is $$\sigma_{\hat{e}}^2 = \frac{\sigma_1^2}{4}(w_1 + w_2 - w_3)^2 + \frac{\sigma_2^2}{4}(-w_1 + w_2 + w_3)^2 + \frac{\sigma_3^2}{4}(w_1 - w_2 + w_3)^2 + w_2^2 \sigma_\epsilon^2 + w_3^2 \sigma_\epsilon^2.$$

Equation (30)

To minimize Eq. (30) with respect to $w_1$, $w_2$, and $w_3$ yet simplify the analysis, take $\sigma^2_1 = \sigma^2_2 = \sigma^2_3 = \sigma^2$, and define the ratio $\chi = \sigma_\epsilon / \sigma$. The variance may now be minimized when $$w_1 = \frac{1}{D}[2(2 + \alpha_2 + \alpha_3) + (6 + \alpha_2 + \alpha_3)\chi^2 + 2\chi^4]$$

$$w_2 = \frac{1}{D}[2(1 + 2\alpha_2 + \alpha_3) + (1 + 3\alpha_2)\chi^2]$$

$$w_3 = \frac{1}{D}[2(1 + \alpha_{12} + 2\alpha_3) + (1 + 3\alpha_3)\chi^2]$$

Equation (31)

where D is given by $$D = 2[(1+\alpha_2)^2 + (\alpha_2 + \alpha_3)^2 + (1+\alpha_3)^2] + [6+2(\alpha_2+\alpha_3)+3(\alpha_{22}+\alpha_{23})]\chi^2 + 2\chi^4.$$

Equation (32)

The minimized variance in this case is now $$\sigma_{\hat{e}}^2 = \frac{\sigma^2}{D^2}\{4[(1+\alpha_2)^2 + (\alpha_2+\alpha_3)^2 + (1+\alpha_3)^2] + [24 + 8(\alpha_2+\alpha_3) + 12(\alpha_2^2+\alpha_3^2)]\chi^2 + 2(15 + \alpha_2 + 3\alpha_2^2 + \alpha_3 + 3\alpha_3^2 - 3\alpha_2\alpha_3)\chi^4 + 16\chi^6 + 3\chi^8\}.$$

Equation (33)

These solutions may be examined in two limits. First when $\chi >> 1$, this implies that $\sigma_\epsilon >> \sigma$. In other words, the error on the estimate of the ratios $\alpha_2$ and $\alpha_3$ is very high. In this limit we see that $w_1 = 1$, $w_2 = 0$, $w_S = 0$, $w_3 = 0$, and $\sigma_{\hat{e}} = 3/4\sigma^2$.

Figure 11:
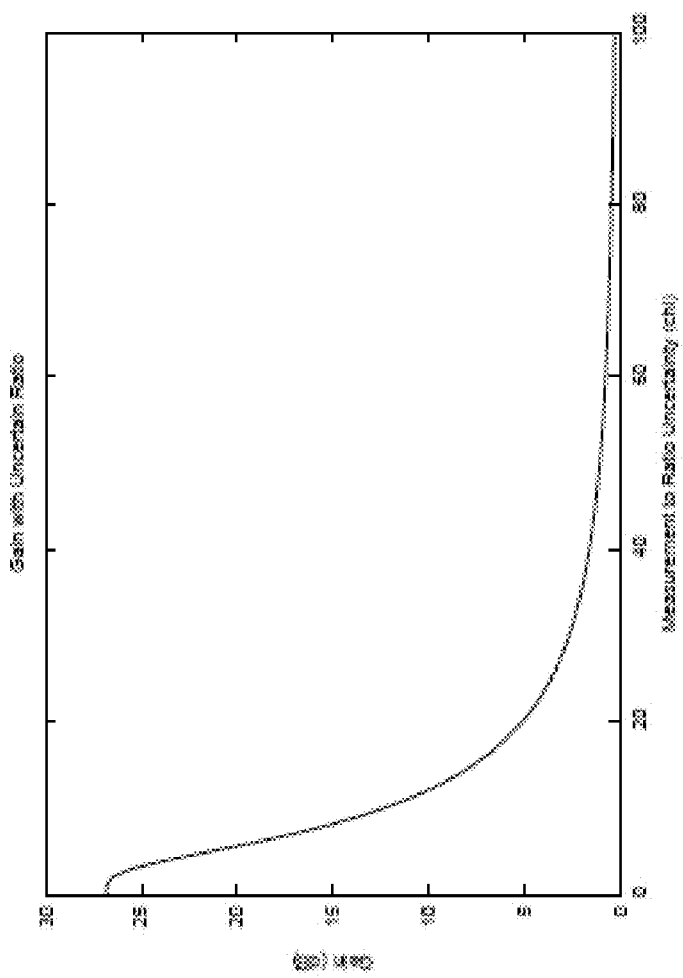
FIG. 11 illustrates a graph of the SNR gain as a function of $\chi$.

FIG. 11 illustrates a graphic of the SNR gain as a function of $\chi$. The horizontal axis is the ratio $\chi = \sigma_\epsilon / \sigma$ and the vertical axis is the gain in dB calculated as 10 log G. The results show that using the estimator in Eq. (23) results in a dramatic improvement in SNR over the estimator of Eq. (21). The gain fails off as $\chi$ increases. For very large values of $\chi$ that gain is still significant. Even for $\chi = 20$ there is a gain of roughly 5 dB.

The three band example discussed above may be generalized for useful applications of imaging system 100. The same notation is retained for simplicity. The coded N band measurement is given in Eq. (5). It may be rewritten in single pixel notation as $$m_i = \Sigma_{j=0}^{N-1} q_{ij} s_j + n_i.$$

Equation (34):

The estimator for the signal is given in Eq. (10), and is rewritten in simplified notation as $$e_1 = s_1 + \Sigma_{k=0}^{N-1} r_{k-1} n_k,$$

Equation (35):

where $$r_{k-l} = \frac{1}{N} \sum_{j=0}^{N-1} \psi_j^{-1} e^{-2\pi i (k-1) j / N}.$$

Equation (36)

For the case of a quadratic residue filter, Eq. (36) reduces to $$r_{k-l} = \frac{2}{N+1}(2q_{k-1} - 1)$$

as shown in Eq. (8).

Just as with the three band example, we now assume that the ratios between the spectral bands are known. Thus we write all bands in terms of band 0 as $$s_i = \alpha_i s_0 + \in_i$$

Equation (37):

where $\alpha_i = s_i / s_0$ is the ratio between signal $s_i$ and $s_0$ and $\in_i$ accounts for any error in the estimate in the ratio. New estimator $s_0$ is created by combining all of the estimators of the various bands with a weighting factor such that $$\hat{e}_0 = \Sigma_{l=0}^{N-1} w_l e_l = \Sigma_{l=0}^{N-1} (w_l \alpha_l s_0 + \in_l + \Sigma_{k=0}^{N-1} r_{k-1} n_k),$$ Equation (38):

subject to the constraint that $\Sigma_{l=0}^{N-1} w_l \alpha_l = 1$. The variance of this new estimator is given by $$\pi_{\hat{e}}^2 = \Sigma_{l=0}^{N-1} = w^2{}_l \sigma_{\in,l}^2 + \Sigma_{k=0}^{N-1} (\Sigma_{l=0}^{N-1} w_l r_{k-l})^2 \sigma_k^2,$$ Equation (39):

where $\sigma_{\in,l}^2 = \langle \in_l^2 \rangle$ is the expectation value of the square error in the ratio estimate.

To minimize Eq. (39) with the constraint given above, the function may be defined as $$f(w_l, \lambda) \equiv \sigma_{\hat{e}}^2 + \lambda(\Sigma_{l=0}^{N-1} w_l \alpha_l - 1),$$

Equation (40):

which may be minimized with respect to $w_l$ and $\lambda$. Taking the gradient with respect to the $w_l$'s and $\lambda$ yields the following N+1 with N+1 unknowns $$2w_l \sigma_{\in,l}^2 + 2\Sigma_{k=0}^{N-1} \Sigma_{j=0}^{N-1} w_j r_{k-j} r_{k-l} \sigma_k^2 + \lambda \alpha_l = 0$$

$$\Sigma_{l=0}^{N-1} w_l \alpha_l = 1.$$

Equation (41):

Eq. (41) may be solved for the weights w1 so that an estimator is created given Eq. (38) that has the noise minimized. To solve Eq. (41) in general requires an N+1× N+1 matrix inverse operation for each pixel on the focal plane array. This problem quickly becomes too time consuming for more than a few spectral bands and pixels. However a few simplifying assumptions may be taken which allow the matrix inverse operation to be done very quickly. The sacrifice is that the true noise minimum will not be found, but numerical tests have shown that the error increase is minimal while the speed increase is dramatic.

The first simplifying assumption regards the noise terms $\sigma_k^2 = \sigma_{cam}^2 + \sigma_{k,SN}^2$. Assume that the camera noise is much greater than the shot noise such that $\sigma_k^2 = \sigma_{cam}^2 \equiv \sigma^2$ is independent of the parameter k. Assume further that error term $\sigma_{\in,l}^2$ may be ignored. This term accounts for the uncertainty in the exact knowledge of the spectral ratios. Ignoring this term shows the worst case scenario (i.e., simply the original estimator), which occurs when no a priori knowledge of the ratios is used. Thus the error will generally not get worse than the original estimator. Numerical simulations have shown that ignoring this term does cause a slight decrease in the optimization routine, but again this loss is minimal compared to the speed gained when ignoring this term. With these assumptions Eq. (41) may be rewritten as $$\Sigma_{k=0}^{N-1} \Sigma_{j=0}^{N-1} w_j r_{k-j} r_{k-l} + \lambda' \alpha_l = 0$$

$$\Sigma_{l=0}^{N-1} = w_l \alpha_l = 1. \qquad \text{Equation (42):}$$

A new Lagrange multiplier is defined as $\lambda' = \lambda/2\sigma^2$ for simplicity. The reason for these simplifications becomes apparent when the equation is written in matrix form $$\begin{pmatrix} r_k r_k & r_{k-1} r_k & \cdots & r_{k-(N-1)} r_k & \alpha_0 \\ r_k r_{k-1} & r_{k-1} r_{k-1} & \cdots & r_{k-(N-1)} r_{k-1} & \alpha_1 \\ \vdots & \vdots & \ddots & \vdots & \vdots \\ r_k r_{k-(N-1)} & r_{k-1} r_{k-(N-1)} & \cdots & r_{k-(N-1)} r_{k-(N-1)} & \alpha_{N-1} \\ \alpha_0 & \alpha_1 & \cdots & \alpha_{N-1} & \alpha_0 \end{pmatrix} \qquad \text{Equation (43)}$$

$$\begin{pmatrix} w_0 \\ w_1 \\ \vdots \\ w_{N-1} \\ \lambda' \end{pmatrix} = \begin{pmatrix} 0 \\ 0 \\ \vdots \\ 0 \\ 1 \end{pmatrix}.$$

Eq. (43) uses summation notation such that any two variables side-by-side that contain the same index are summed over that index. Thus $r_{k-j} r_k = \Sigma_{k=0}^{N-1} r_{k-j} r_k$. Negative indices wrap around as do indices great that N−1.

The four blocks of Eq. (43) are now defined. The N×N upper left block is $$R = \begin{pmatrix} r_k r_k & r_{k-1} r_k & \cdots & r_{k-(N-1)} r_k \\ r_k r_{k-1} & r_{k-1} r_{k-1} & \cdots & r_{k-(N-1)} r_{k-1} \\ \vdots & \vdots & \ddots & \vdots \\ r_k r_{k-(N-1)} & r_{k-1} r_{k-(N-1)} & \cdots & r_{k-(N-1)} r_{k-(N-1)} \end{pmatrix} \qquad \text{Equation (44)}$$

The vector a is $$a = \begin{pmatrix} \alpha_0 \\ \alpha_1 \\ \vdots \\ \alpha_{N-1} \end{pmatrix}, \qquad \text{Equation (45)}$$

along with $a^T$ its transpose, and the vector w is $$w = \begin{pmatrix} w_0 \\ w_1 \\ \vdots \\ w_{N-1} \\ \lambda' \end{pmatrix}. \qquad \text{Equation (46)}$$

These definitions allow Eq. (43) to be rewritten as $$\begin{pmatrix} R & a \\ a^T & 0 \end{pmatrix} \begin{pmatrix} w \\ \lambda' \end{pmatrix} = \begin{pmatrix} 0 \\ 1 \end{pmatrix}. \qquad \text{Equation (47)}$$

Processor 150 may remove the 0 in the bottom right term to invert Eq. (47). Processor 150 may do this by adding the row directly above the last row since it is equal to 0. This yields an equation in the form $$\begin{pmatrix} R & a \\ b^T & \alpha_{N-1} \end{pmatrix} \begin{pmatrix} w \\ \lambda' + w_{N-1} \end{pmatrix} = \begin{pmatrix} 0 \\ 1 \end{pmatrix}, \qquad \text{Equation (48)}$$

where $b^T$ is the vector $a^T$ with the row directly above it added to it. Processor 150 may invert the matrix in Block form, which gives the solution for the w vector as $$w = -\frac{1}{c} R^{-1} a \qquad \text{Equation (49)}$$

where $c = \alpha_{N-1} - b^T R^{-1} a$.

The solution for the weighting terms $w_i$ now requires an N×N inverse of the matrix R along with a matrix multiplication step. The reason for the speed increase is that the matrix R is constant over the entire focal plane, thus the inverse only needs to be calculated once. Only the vectors a and $b^T$ change for each pixel. In addition the matrix R is circulant, and thus its inverse can be calculated using a Fourier transform. Thus, processor 150 may invert the N×N block using a Fast Fourier Transform (FFT). We have now reduced our problem from calculating an N+1×N+1 matrix inverse for every single pixel on our focal plane to calculate a length N Fourier transform once, and doing a simple matrix multiplication for each pixel on the focal plane. Imaging system 100 is therefore enhanced to provide a dramatic speed increase to the noise minimization algorithm.

As described above, imaging system 100 may use neighboring pixels to better estimate these ratios, and obtain large SNR enhancement. This relies on the assumption that the spectrum varies slowly over a few pixels on the focal plane. For natural scenes this should typically be the case. If this assumption is not valid other methods may also exist to estimate the ratios such as predefined spectral catalogs or physical models.

Figure 12:
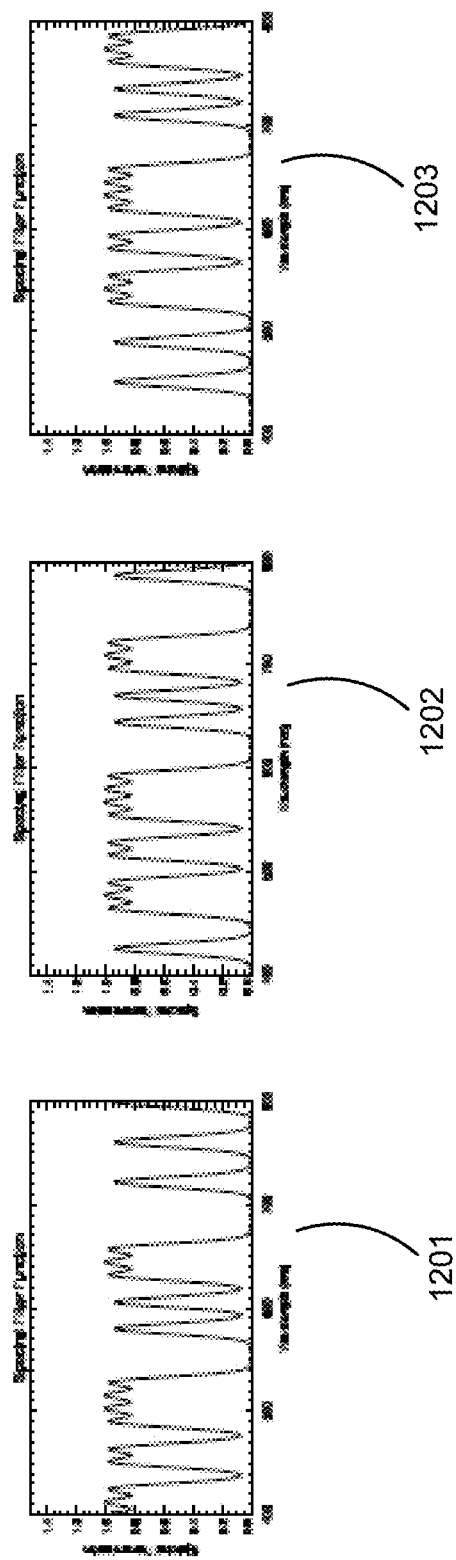
FIG. 12 illustrates an exemplary sequence of images taken with the same filter which is circularly shifted for each image.
Figure 13:
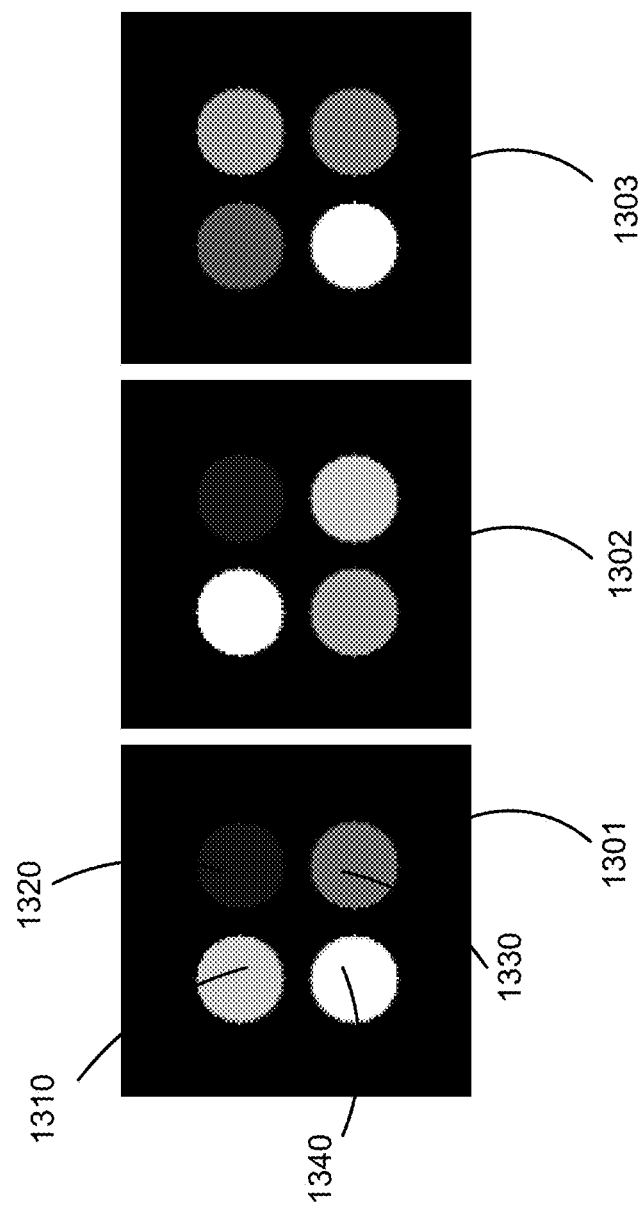
FIG. 13 illustrates an exemplary panchromatic sequence of images taken of a scene which contains four circular sources each with a unique spectral profile.

FIG. 12 illustrates an exemplary sequence of images 1201-1203 taken with the same filter which is circularly shifted for each image. Consider a simulated scene which contains four circular sources each with uniform intensity across the source, but with unique spectral signatures. FIG. 13 illustrates an exemplary panchromatic sequence of images taken of a scene which contains four circular sources 1310, 1320, 1330, and 1340 each with a unique spectral profile 1301-1303. The noise-free panchromatic images correspond to an output one may expect using the exemplary filters of FIG. 13.

Figure 14:
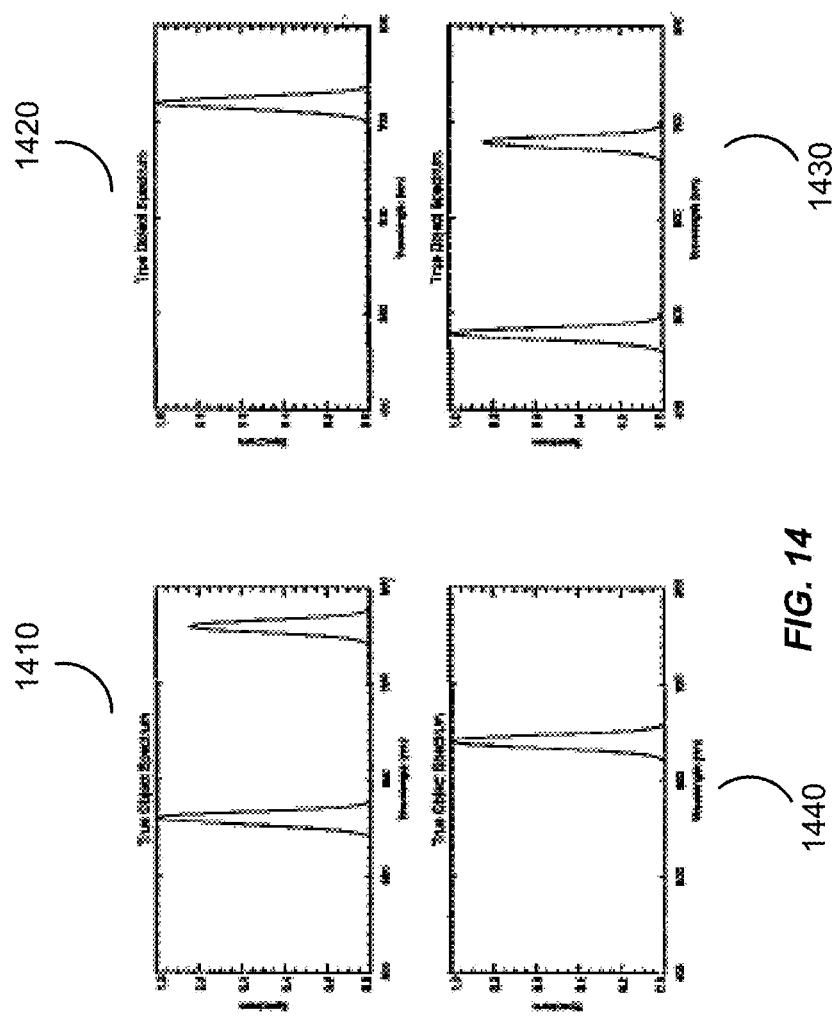
FIG. 14 illustrates actual spectrum for each source of FIG. 13 in an exemplary embodiment.
Figure 15:
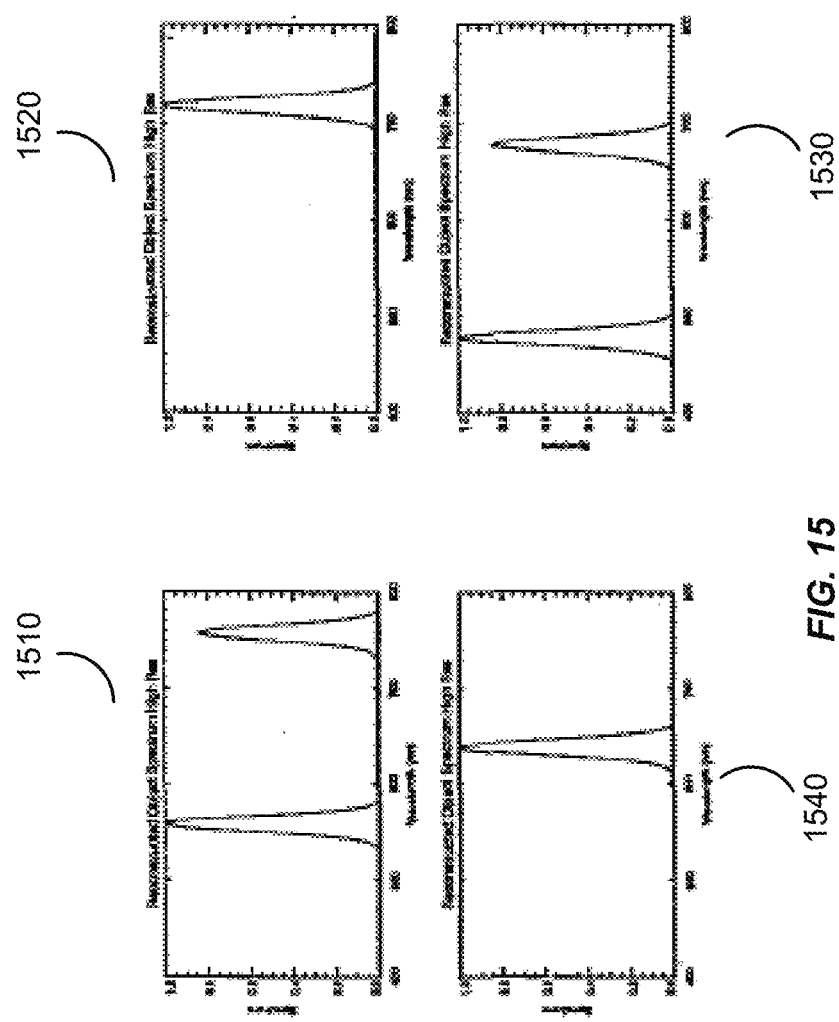
FIG. 15 illustrates a high resolution reconstruction of the spectrum from the panchromatic images of FIG. 13 in an exemplary embodiment.

FIG. 14 illustrates the actual spectrum for each source of FIG. 13 in an exemplary embodiment. The upper left plot 1410 of FIG. 14 corresponds with the upper left source 1302 of FIG. 13 and so on. FIG. 15 illustrates a high resolution reconstruction of the spectrum from the panchromatic images of FIG. 13 in an exemplary embodiment. Here, processor 150 used a length 31 quadratic residue and expanded it to a length 310 array in the simulation thus providing a 310 spectral band resolution.

Figure 16:
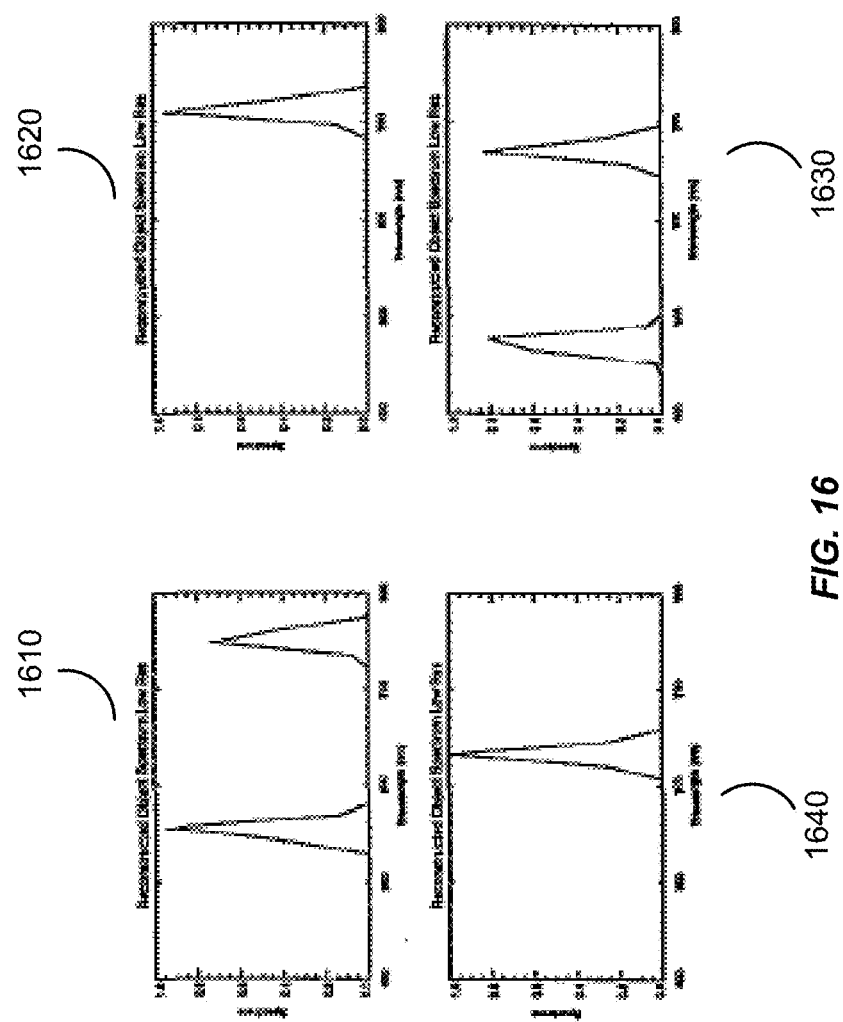
FIG. 16 illustrates a reconstruction of the spectrum from the panchromatic images of FIG. 13 in an exemplary embodiment.

FIG. 16 illustrates a reconstruction of the spectrum from the panchromatic images of FIG. 13 in an exemplary embodiment. Here, image processor 150 has reconstructed the spectrum from only 31 images. Though FIG. 16 shows resolution degradation since there are only 31 spectral bands the peaks are nonetheless clearly visible. It will be appreciated that this process is merely exemplary for what happens when using a fewer number of images to do the reconstruction and thus does not represent a best possible result.

Figure 17:
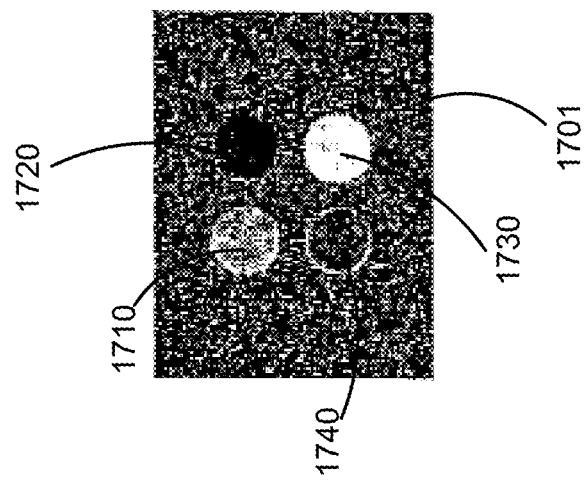
FIG. 17 illustrates a noisy image in an exemplary embodiment.

FIG. 17 illustrates a noisy image in an exemplary embodiment. The sources 1710-1740 of the scene 1701 are captured in an image which includes shot noise and camera noise. Assume for this example, that the shot noise is taken to be a Gaussian random variable with variance proportional to the intensity of the image, and the camera noise is also a Gaussian random variable but with constant variance from image to image.

Figure 18:
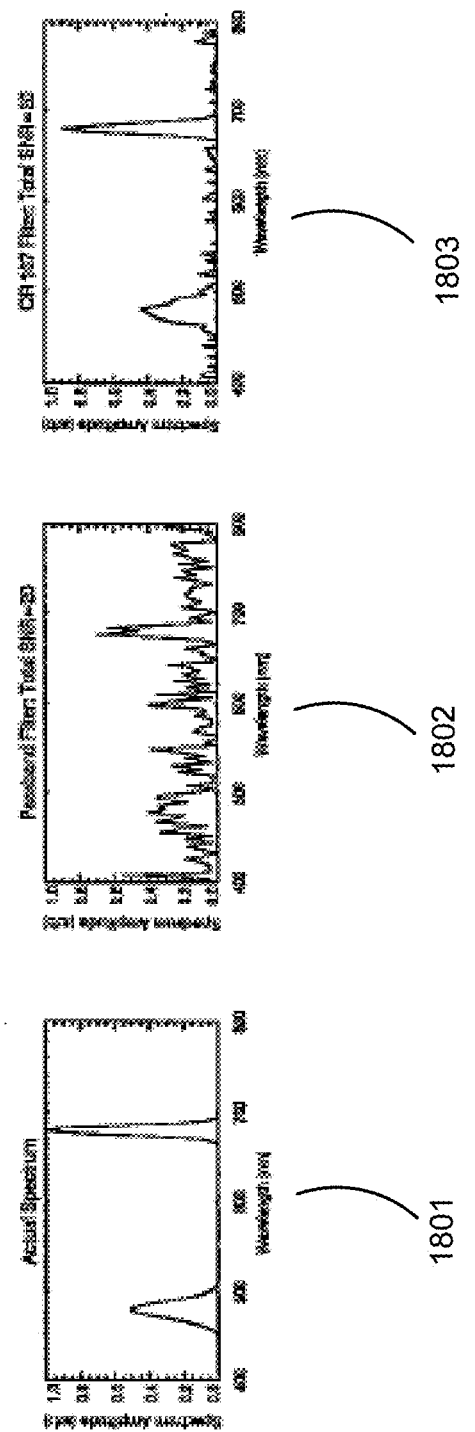
FIG. 18 illustrates a comparison of spectrums for a pixel in the noisy image of FIG. 17 in an exemplary embodiment.

Consider reconstruction of the spectral datacube of a simulated scene, in the presence of the noise as in FIG. 17 using prior techniques (e.g., single passband filters) as well as using the processes described herein with respect to imaging system 100. FIG. 18 illustrates a comparison of spectrums for a pixel in the noisy image of FIG. 17 in an exemplary embodiment. Plot 1801 shows the actual spectrum of a pixel of the upper left source 1710 in the image of FIG. 17. Plot 1802 shows a reconstructed spectrum of the pixel using 107 single passband filters. Plot 1803 shows a reconstructed spectrum using 107 quadratic residue sequences in an exemplary embodiment (e.g., reconstructed with the processes of imaging system 100). For this example, assume a filter resolution with a length 107 quadratic residue sequence with a 1 nm Gaussian passband. In this simulation, the peak signal of the camera noise ratio (ignoring shot noise) is 20 if no filter is used and all photons of all wavelength s are captured.

Plot 1803 shows a dramatic improvement when using the quadratic residue filter. Using Eq. (18), and the noise parameters used in this simulation, the estimated SNR obtained when using a quadratic residue coded filter should be at least 3.7 times that of the single passband case or roughly a 5.5 dB improvement in SNR. Compare this estimate to the standard deviation of the actual signal minus the passband signal, and the actual signal minus the signal using imaging system 100. The 5.5 dB gain estimate agrees quantitatively with the ratio of these error measures, and is qualitatively consistent with the improvement seen in FIG. 18

Figure 19:
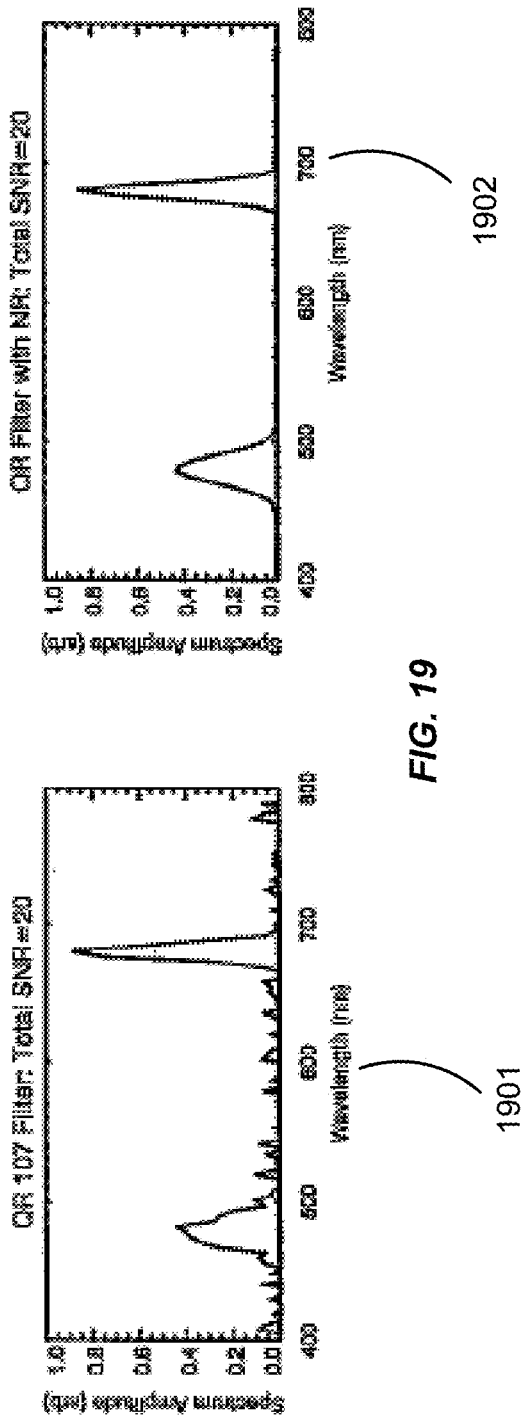
FIG. 19 illustrates a comparison of spectrums for a pixel in the noisy image of FIG. 17 in another exemplary embodiment.

For some scenes, such as natural scenes, it may be assumed that the spectrum varies slowly from pixel to pixel. Processor 150 may thus be configured to estimate the ratios using a nearest neighbor average. In this example, processor 150 uses five nearest neighbors of a pixel. FIG. 19 illustrates a comparison of spectrums for a pixel in the noisy image of FIG. 17 in another exemplary embodiment. Here, plot 1901 shows the actual spectrum of a pixel of the upper left source 1710 in the image of FIG. 17. And plot 1902 shows a reconstructed spectrum using 107 quadratic residue sequences in an exemplary embodiment (e.g., reconstructed with the processes of imaging system 100) and with the noise minimization algorithm applied.

Experimental Results

Figure 20:
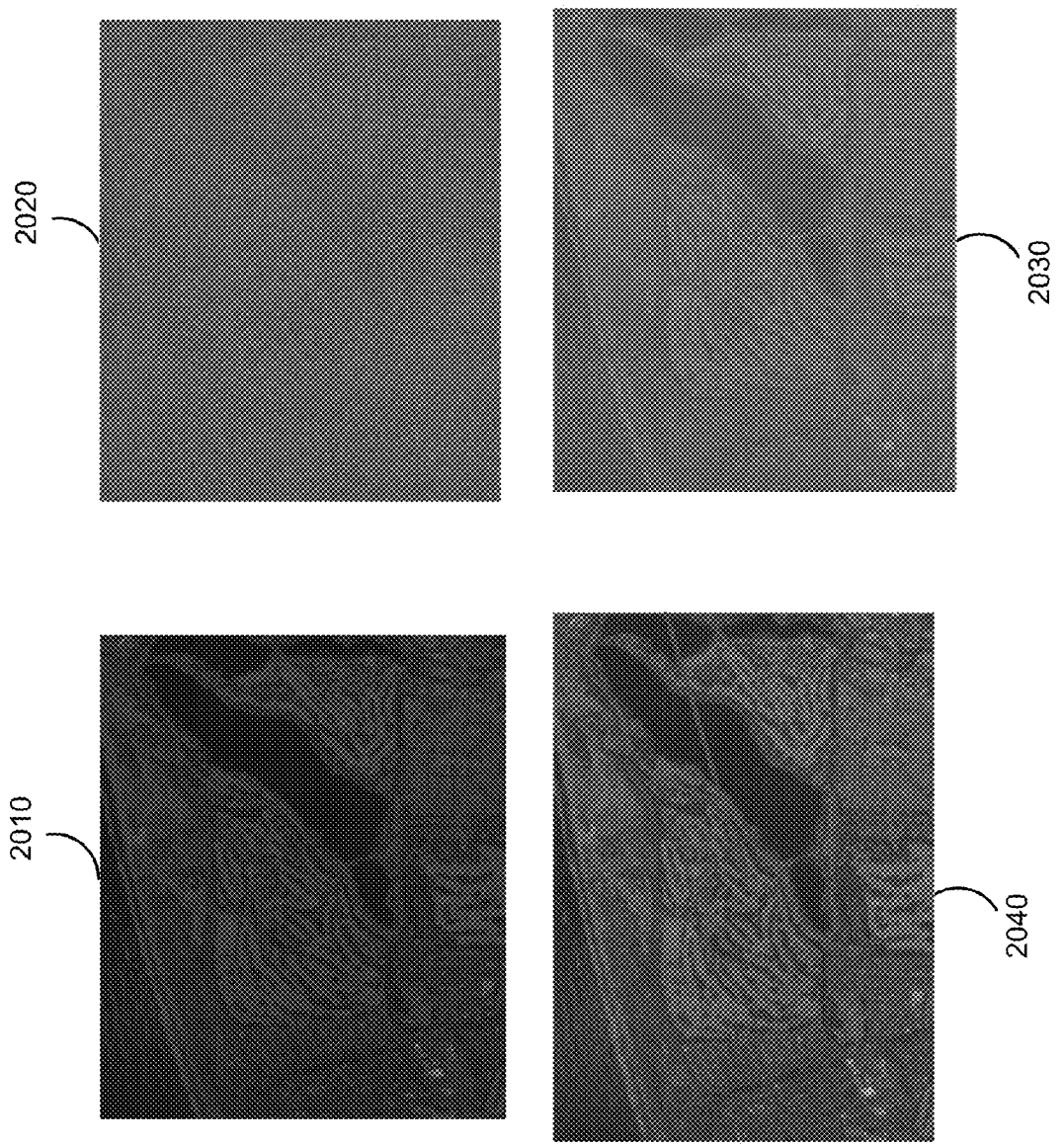
FIG. 20 illustrates images obtained from simulated measurements of a hyperspectral datacube in an exemplary embodiment.

FIG. 20 illustrates images obtained from simulated measurements of a hyperspectral datacube in an exemplary embodiment. The simulations of this example used actual hyperspectral image data obtained from the NASA MASTER program, a joint development involving the Airborne Sensor Facility at the Ames Research Center, the Jet Propulsion Laboratory and the EROS Data Center that provides imaging data online for public availability. Plot 2010 shows an RGB image of the hyperspectral "truth" datacube. Plots 2020 shows the simulated effect of measuring the datacube one band at a time using a passband filter, and plot 2030 shows the simulated effect of measuring multiple bands using a length 47 quadratic residue filter. Plot 2040 shows the effect of performing the noise minimization algorithm on the simulated noisy datacube obtained from using the quadratic reside filter. Thus, plot 2040 shows a black and white version of the false color RGB image obtained after performing the noise minimization. FIG. 20 shows an improvement in the image quality over that shown in plots 1320 and 1330, although the gain may be difficult to see in print form.

Here, the five nearest neighbors of a pixel were used to estimate the spectral ratios. The relative error for each datacube compared to the truth was calculated in each case. The SNR gain from changing from the passband to QR filter was roughly a factor of 2 or about 3 dB. The SNR gain one obtains when performing the noise minimization is a factor or 7 better than the QR measurement or about 8.5 dB improvement.

Figure 21:
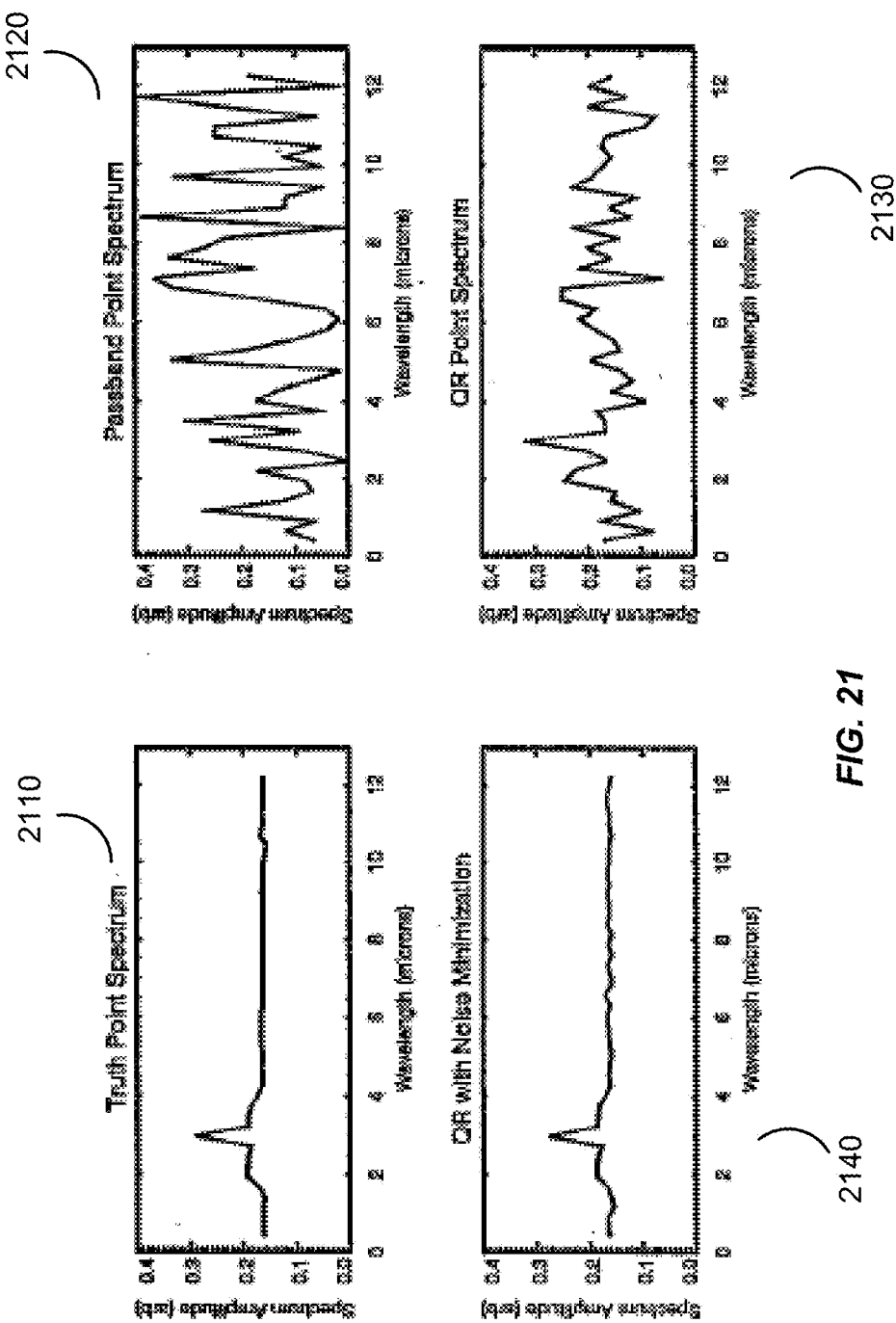
FIG. 21 illustrates a comparison of the spectrum for the central pixel of FIG. 20.

FIG. 21 illustrates a comparison of the spectrum for the central pixel of FIG. 20. The plots of FIG. 21 highlight the dramatic SNR gain. Plot 2110 shows the truth point spectrum, plot 2120 shows the simulated passband point spectrum measurement, plot 2130 shows the simulated QR point spectrum measurement, and plot 2140 shows the simulated QR measurement with noise reduction algorithm. Each spectrum becomes progressively better, resulting in the final measurement which has very little noise corruption.

Figure 22:
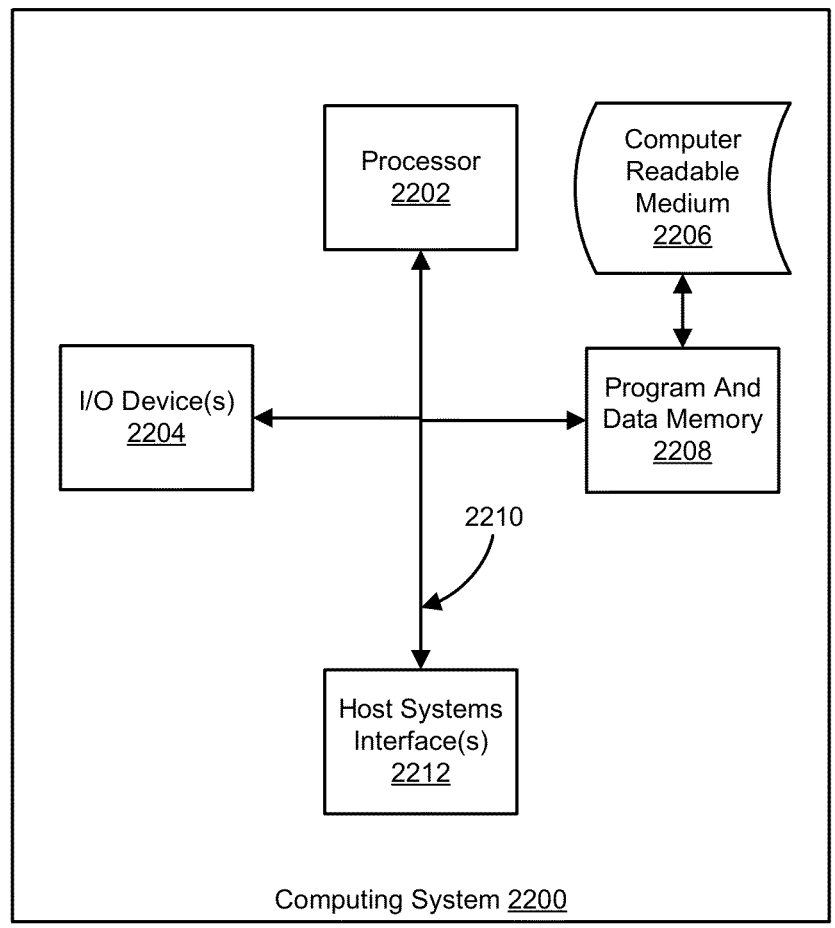
FIG. 22 is a block diagram of an exemplary computing system in which a computer readable medium provides instructions for performing methods herein.

The invention can also take the form of an entirely hardware embodiment, an entirely software embodiment or an embodiment containing both hardware and software elements. In one embodiment, the invention is implemented in software, which includes but is not limited to firmware, resident software, microcode, etc. FIG. 22 illustrates a computing system 2200 in which a computer readable medium 2206 may provide instructions for performing any of the methods disclosed herein.

Furthermore, the invention can take the form of a computer program product accessible from the computer readable medium 2206 providing program code for use by or in connection with a computer or any instruction execution system. For the purposes of this description, the computer readable medium 2206 can be any apparatus that can tangibly store the program for use by or in connection with the instruction execution system, apparatus, or device, including the computer system 2200.

The medium 2206 can be any tangible electronic, magnetic, optical, electromagnetic, infrared, or semiconductor system (or apparatus or device). Examples of a computer readable medium 2206 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 2200, suitable for storing and/or executing program code, can include one or more processors 2202 coupled directly or indirectly to memory 2208 through a system bus 2210. The memory 2208 can include local memory employed during actual execution of the program code, bulk storage, and cache memories which provide temporary storage of at least some program code in order to reduce the number of times code is retrieved from bulk storage during execution. Input/output or I/O devices 2204 (including but not limited to keyboards, displays, pointing devices, etc.) can be coupled to the system either directly or through intervening I/O controllers. Network adapters may also be coupled to the system to enable the computing system 2200 to become coupled to other data processing systems, such as through host systems interfaces 2212, or remote printers or storage devices through intervening private or public networks. Modems, cable modem and Ethernet cards are just a few of the currently available types of network adapters.

What is claimed is:

1. A spectral imaging system, comprising:
   an optical element configured to receive electromagnetic energy of a two-dimensional scene;
   a filter configured to provide a plurality of spectral filter profiles, and to transmit multiple spectral wavebands of the electromagnetic energy substantially simultaneously through at least one of the plurality of spectral profiles;
   a detector configured to measure intensities of the multiple spectral wavebands transmitted through the at least one spectral profile; and
   a processor configured to generate a spectral image of the scene based on the measured intensities,
   wherein the processor is configured to reduce errors in the spectral image based on a ratio between two or more of the measured intensities, and to obtain the ratio based on spatial correlations in the spectral image.

2. The system of claim 1, wherein:
   the spectral filter profiles each comprise a static multiple-waveband filter;
   the detector comprises a single sensor element of a two-dimensional array of sensor elements; and
   each static multiple-waveband filter transmits multiple spectral wavebands onto individual sensor elements of the two-dimensional array.

3. The system of claim 1, wherein:
   the processor is further configured to obtain the ratio based on apriori information of the scene.

4. The system of claim 1, wherein:
   the electromagnetic energy includes a red waveband, a blue waveband, and a green waveband; and
   the filter comprises:
     a first spectral profile configured to transmit the red waveband and the blue waveband, and to attenuate the green waveband;
     a second spectral profile configured to transmit the red waveband and the green waveband, and to attenuate the blue waveband; and
     a third spectral profile configured to transmit the green waveband and the blue waveband, and to attenuate the red waveband.

5. A method for imaging a scene, the method comprising:
   receiving electromagnetic energy of a two-dimensional scene;
   transmitting, with a filter, multiple spectral wavebands of the electromagnetic energy substantially simultaneously through at least one of a plurality of spectral profiles of the filter;
   measuring, with a detector, intensities of the multiple spectral wavebands through the at least one spectral profile;
   generating a spectral image of the scene based on the measured intensities;
   reducing errors in the spectral image based on a ratio between two or more of the measured intensities; and
   obtaining the ratio based on spatial correlations in the spectral image.

6. The method of claim 5, further comprising:
   measuring, with a single sensor element in a two-dimensional array of the detector, two or more of the transmitted wavebands substantially simultaneously.

7. The method of claim 5, wherein:
   the spectral filter profiles each comprise a static multiple-waveband filter that transmits different portions of the electromagnetic energy from one another; and
   each static multiple-waveband filter transmits multiple spectral wavebands onto individual sensor elements of the two-dimensional array.

8. The method of claim 5, further comprising:
   obtaining the ratio based on apriori information of the scene.

9. The method of claim 5, wherein:
   the electromagnetic energy includes a red waveband, a blue waveband, and a green waveband; and
   the filter comprises:
     a first spectral profile configured to transmit the red waveband and the blue waveband, and to attenuate the green waveband;
     a second spectral profile configured to transmit the red waveband and the green waveband, and to attenuate the blue waveband; and
     a third spectral profile configured to transmit the green waveband and the blue waveband, and to attenuate the red waveband.

10. A non-transitory computer readable medium comprising instructions that, when executed by a processor, direct the processor to:
    process measured intensities from a detector of multiple spectral wavebands of received electromagnetic energy of a two-dimensional scene through at least one spectral profile of a filter, wherein the filter transmitted the multiple spectral wavebands substantially simultaneously through the at least one spectral profile;
    generate a spectral image of the scene based on the measured intensities;
    reduce errors in the spectral image based on a ratio between two or more of the measured intensities; and
    obtain the ratio based on spatial correlations in the spectral image.

11. The computer readable medium of claim 10, further comprising instructions that direct the processor to:
    process two or more of the transmitted wavebands substantially simultaneously from a single sensor element in a two-dimensional array of the detector.

12. The computer readable medium of claim 10, wherein:
    the spectral filter profiles each comprise a static multiple-waveband filter that transmits different portions of the electromagnetic energy from one another; and each static multiple-waveband filter transmits multiple spectral wavebands onto individual sensor elements of the two-dimensional array.

13. The computer readable medium of claim 10, further comprising instructions that direct the processor to:
obtain the ratio based on apriori information of the scene.

14. The computer readable medium of claim 10, wherein:
the electromagnetic energy includes a red waveband, a blue waveband, and a green waveband; and
the filter comprises:
- a first spectral profile configured to transmit the red waveband and the blue waveband, and to attenuate the green waveband;
- a second spectral profile configured to transmit the red waveband and the green waveband, and to attenuate the blue waveband; and
- a third spectral profile configured to transmit the green waveband and the blue waveband, and to attenuate the red waveband.

* * * * *